(12) United States Patent
Pursifull

(10) Patent No.: US 9,103,288 B2
(45) Date of Patent: Aug. 11, 2015

(54) PARALLEL ASPIRATOR ARRANGEMENT FOR VACUUM GENERATION AND COMPRESSOR BYPASS

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 14/038,497

(22) Filed: Sep. 26, 2013

(65) Prior Publication Data

US 2015/0083094 A1  Mar. 26, 2015

(51) Int. Cl.
| | |
|---|---|
| F02B 33/44 | (2006.01) |
| F02B 33/00 | (2006.01) |
| F02D 23/00 | (2006.01) |
| F02B 37/16 | (2006.01) |
| F02D 33/02 | (2006.01) |
| F02M 35/10 | (2006.01) |

(52) U.S. Cl.
CPC ............... *F02D 23/00* (2013.01); *F02B 37/16* (2013.01); *F02D 33/02* (2013.01); *F02B 2037/162* (2013.01); *F02M 35/10229* (2013.01)

(58) Field of Classification Search
CPC .............. F02D 31/005; F02D 41/0007; F02D 2250/41; F02B 37/16; F02B 2037/162; F02M 35/10229; Y02T 10/144
USPC ..................... 60/598, 600; 123/520
See application file for complete search history.

(56) References Cited

U.S. PATENT DOCUMENTS

| | | | |
|---|---|---|---|
| 4,270,508 A | 6/1981 | Lindberg | |
| 2011/0132311 A1* | 6/2011 | Pursifull et al. | 123/184.56 |
| 2011/0132331 A1* | 6/2011 | Pursifull | 123/478 |
| 2013/0233287 A1 | 9/2013 | Leone | |

FOREIGN PATENT DOCUMENTS

WO   2009047249 A2   4/2009

OTHER PUBLICATIONS

Beshay, Mansour et al., "Aspirator for Crankcase Ventilation and Vacuum Generation," U.S. Appl. No. 13/549,226, filed Jul. 13, 2012, 43 pages.

(Continued)

*Primary Examiner* — Audrey K Bradley
(74) *Attorney, Agent, or Firm* — Julia Voutyras; Alleman Hall McCoy Russell & Tuttle LLP

(57) ABSTRACT

Methods and systems are provided for a parallel arrangement of at least two aspirators bypassing an intake compressor in an engine system, the aspirator arrangement including an aspirator shut-off valve arranged in series with each aspirator. The aspirator shut-off valves may be controlled based on engine vacuum needs as well as based on intake manifold pressure, during non-boost conditions, and compressor surge, during boost conditions. For example, during boost conditions, the aspirator shut-off valves may be controlled to enable a selectable discrete compressor recirculation flow rate, whereas during non-boost conditions the aspirator shut-off valves may be controlled to enable a selectable, discrete level of vacuum generation for use by various engine vacuum consumers.

17 Claims, 11 Drawing Sheets

(56) References Cited

OTHER PUBLICATIONS

Ulrey, Joseph Norman et al., "Method and System for Fule Vapor Management," U.S. Appl. No. 13/660,884, filed Oct. 25, 2012, 35 pages.

Kragh, Niels Christopher, "System and Method for Gas Purging Control," U.S. Appl. No. 13/852,785, filed Mar. 28, 2013, 31 pages.

Ulrey, Joseph Norman et al., "Crankcase Ventilation Via Crankcase Pulsation," U.S. Appl. No. 13/621,711, filed Sep. 12, 2012, 23 pages.

Pursifull, Ross Dykstra, "Systems and Methods for Multiple Aspirators for a Constant Pump Rate," U.S. Appl. No. 13/962,526, filed Aug. 8, 2013, 44 pages.

Pursifull, Ross Dykstra, "Method and System for Vacuum Generation," U.S. Appl. No. 13/802,020, filed Mar. 13, 2013, 43 pages.

\* cited by examiner

PARALLEL ASPIRATOR ARRANGEMENT FOR VACUUM GENERATION AND COMPRESSOR BYPASS

FIELD

The present application relates to parallel arrangements of valved aspirators coupled to an engine system. In one example, a combined motive flow rate through the aspirators may be controlled to provide discrete levels of vacuum generation during non-boost conditions, and to provide discrete levels of continuous compressor bypass flow during boost conditions.

BACKGROUND AND SUMMARY

Turbocharging an engine allows the engine to provide power similar to that of a larger displacement engine. Thus, turbocharging can extend the operating region of an engine. Turbochargers function by compressing intake air in a compressor via a turbine operated by exhaust gas flow. Under certain conditions, the flow rate and pressure ratio across the compressor can fluctuate to levels that may result in noise disturbances, and in more severe cases, performance issues and compressor degradation. Such compressor surge may be mitigated by one or more compressor bypass valves (CBVs). The CBVs may recirculate compressed air from the compressor outlet to the compressor inlet, and thus may be arranged in a passage which is coupled to the intake upstream of the compressor and downstream of the compressor in some examples. In some examples, continuous CBVs (CCBVs) may be used, which provide a continuous and continually variable circulation flow from downstream of the compressor to upstream of the compressor. CCBVs may provide boost control and compressor surge avoidance, and may further prevent objectionable audible noise. However, incorporation of such valves can add significant component and operating costs to engine systems.

Engines may also include one or more aspirators may be coupled in an engine system to harness engine airflow for generation of vacuum, for use by various vacuum consumption devices that are actuated using vacuum (e.g., a brake booster). Aspirators (which may alternatively be referred to as ejectors, venturi pumps, jet pumps, and eductors) are passive devices which provide low-cost vacuum generation when utilized in engine systems. An amount of vacuum generated at an aspirator can be controlled by controlling the motive air flow rate through the aspirator. For example, when incorporated in an engine intake system, aspirators may generate vacuum using energy that would otherwise be lost to throttling, and the generated vacuum may be used in vacuum-powered devices such as brake boosters. While aspirators may generate vacuum at a lower cost and with improved efficiency as compared to electrically-driven or engine-driven vacuum pumps, their use in engine intake systems has traditionally been constrained by intake manifold pressure. Whereas conventional vacuum pumps produce a pumping curve which is independent of intake manifold pressure, pumping curves for aspirators arranged in engine intake systems may be unable to consistently provide a desired performance over a range of intake manifold pressures. Further, if an aspirator is large enough to replace a conventional vacuum pump, it may flow too much air into the intake manifold for economical fuel use. Some approaches for addressing this issue involve arranging a valve in series with an aspirator, or incorporating a valve into the structure of an aspirator. An opening amount of valve is then controlled to control the motive air flow rate through the aspirator, and thereby control an amount of vacuum generated at the aspirator. By controlling the opening amount of the valve, the amount of air flowing through the aspirator and the air flow rate can be varied, thereby adjusting vacuum generation as engine operating conditions such as intake manifold pressure change. However, again, adding valves to engine systems can add significant component and operating costs.

The inventors herein have identified parallel, valved aspirator arrangements which, when incorporated in an engine system, may advantageously be controlled to provide selectable, discrete levels of vacuum generation during non-boost conditions as well as discrete levels of continuous compressor bypass flow during boost conditions. In one example embodiment, the aspirator arrangement bypasses an intake compressor (e.g., the aspirator arrangement is coupled to the intake passage both upstream and downstream of the compressor), and includes exactly two aspirators having different throat flow areas. An aspirator shut-off valve arranged in series with each aspirator of the aspirator arrangement may be controlled to allow or disallow flow through the corresponding aspirator, such that multiple discrete flow levels through the aspirator arrangement may be achieved (or, in the case of continuously variable aspirator shut-off valves, even more flow levels may be achieved). For example, when intake manifold pressure is below a threshold (e.g., non-boost operation), a combined motive flow rate through the aspirator arrangement may be controlled based on engine vacuum needs and intake manifold pressure. During such conditions, it may be desirable to divert at least some intake airflow around the compressor and through the aspirator arrangement, for example if engine vacuum replenishment is needed. In some examples, the aspirators in the aspirator arrangement may be positioned such that maximum vacuum generation is achieved during bypass flow through the aspirator arrangement from upstream of the compressor to downstream of the compressor. In contrast, when intake manifold pressure is above a threshold (e.g., boost operation), vacuum generation may be less urgent that reduction of compressor surge. Because the pressure differential during boost enables recirculation flow through the aspirator arrangement (e.g., flow from downstream of the compressor to upstream of the compressor), the combined motive flow rate through the aspirator from downstream of the compressor to upstream of the compressor may be controlled based on compressor surge, e.g. such that an increasing combined motive flow rate is provided with increasing compressor surge. Advantageously, even during reverse flow through an aspirator (e.g., flow from a mixed flow outlet of the aspirator to the motive inlet of the aspirator, in the case of an aspirator with an asymmetrical flow geometry designed to maximize flow in one direction), some vacuum may be generated due to the venturi effect. Accordingly, the technical result achieved by the aspirator arrangement described herein includes simultaneous compressor surge reduction and vacuum generation during certain engine operating conditions.

Many additional advantages may be achieved by the embodiments described herein. For example, because multiple, parallel aspirators are used, each aspirator may have a relatively small flow diameter and yet the arrangement can still achieve an overall motive flow rate commensurate with that of a single larger aspirator when needed. The relatively small flow diameters of the aspirators enable the use of smaller, cheaper valves controlling their motive flow. Further, relative flow diameters of the parallel aspirators may be strategically selected such that the valves of the aspirators may be controlled to achieve a desired set of discrete levels of motive flow through the arrangement. Furthermore, because the combined motive flow rate through the aspirator arrangement is controllable via the valves, conditions where the motive flow through the aspirators may cause air flow greater than desired may be reduced. Thus, since air flow rate greater than desired can lead to extra fuel being injected, fuel economy may be improved by use of the aspirator arrangement.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
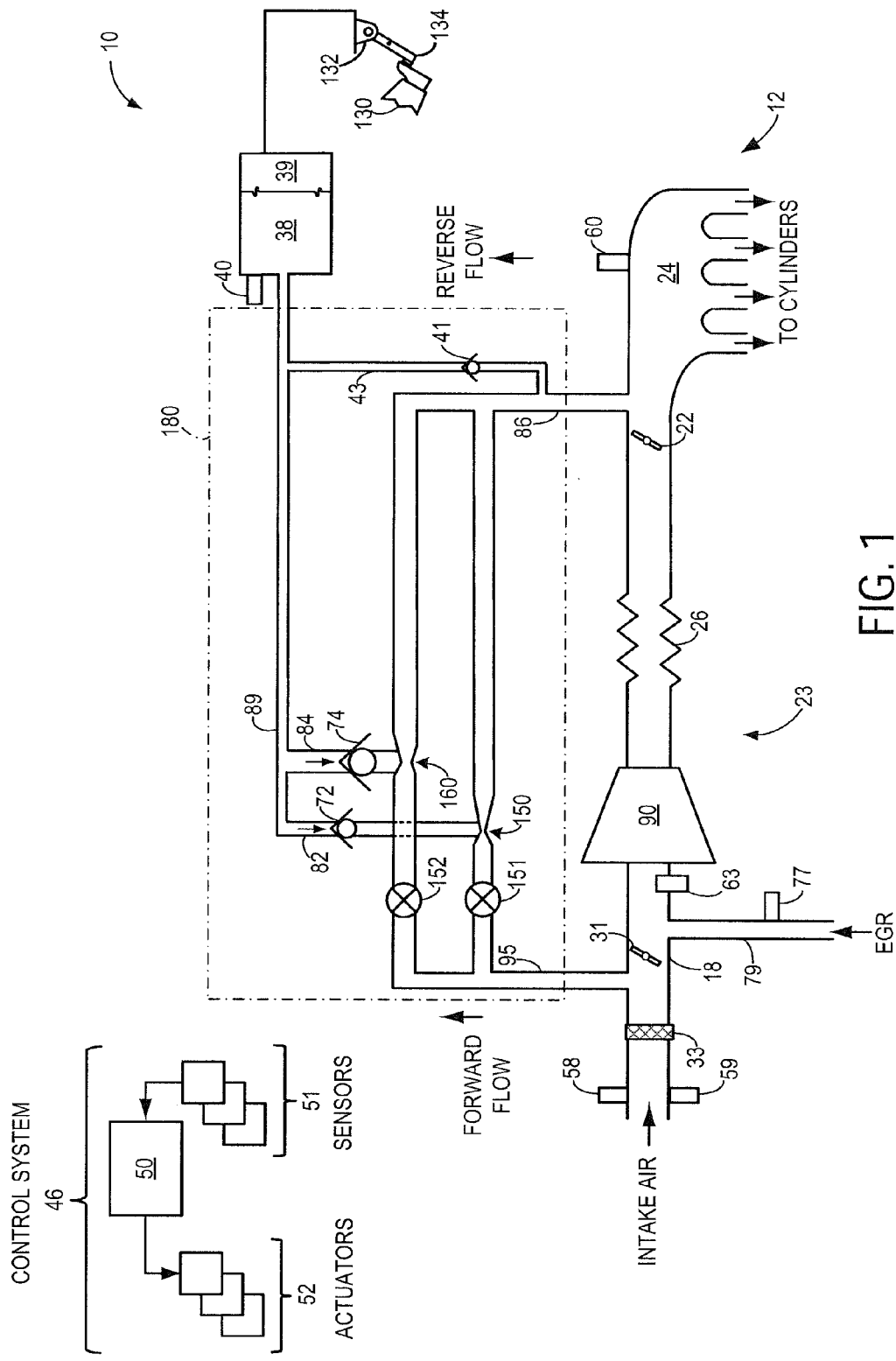
FIG. 1 shows a schematic diagram of a first embodiment of an example engine system including a parallel valved aspirator arrangement bypassing a boost device.
Figure 2:
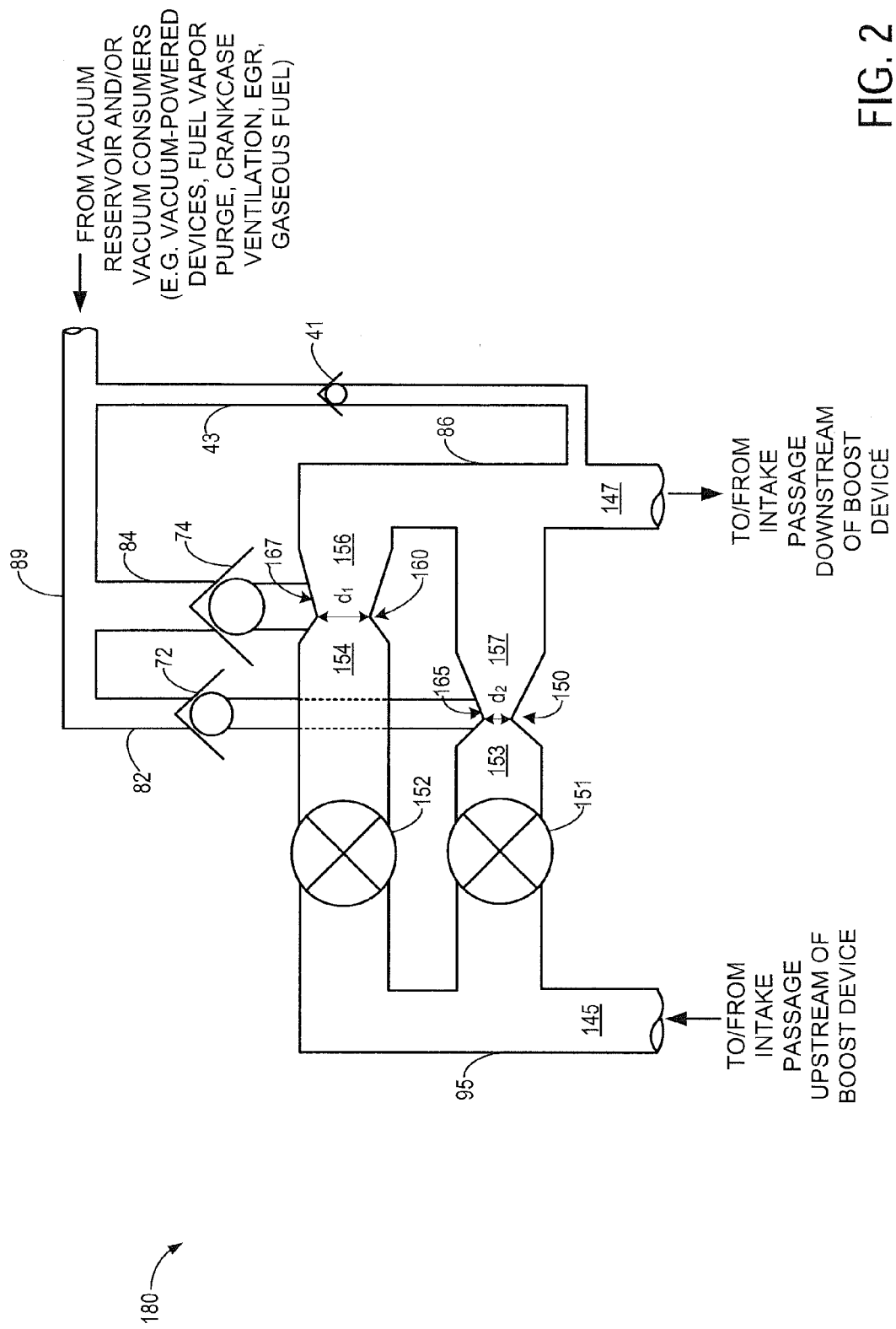
FIG. 2 shows a detail view of an aspirator arrangement which may be included in the engine system of FIG. 1.
Figure 3:
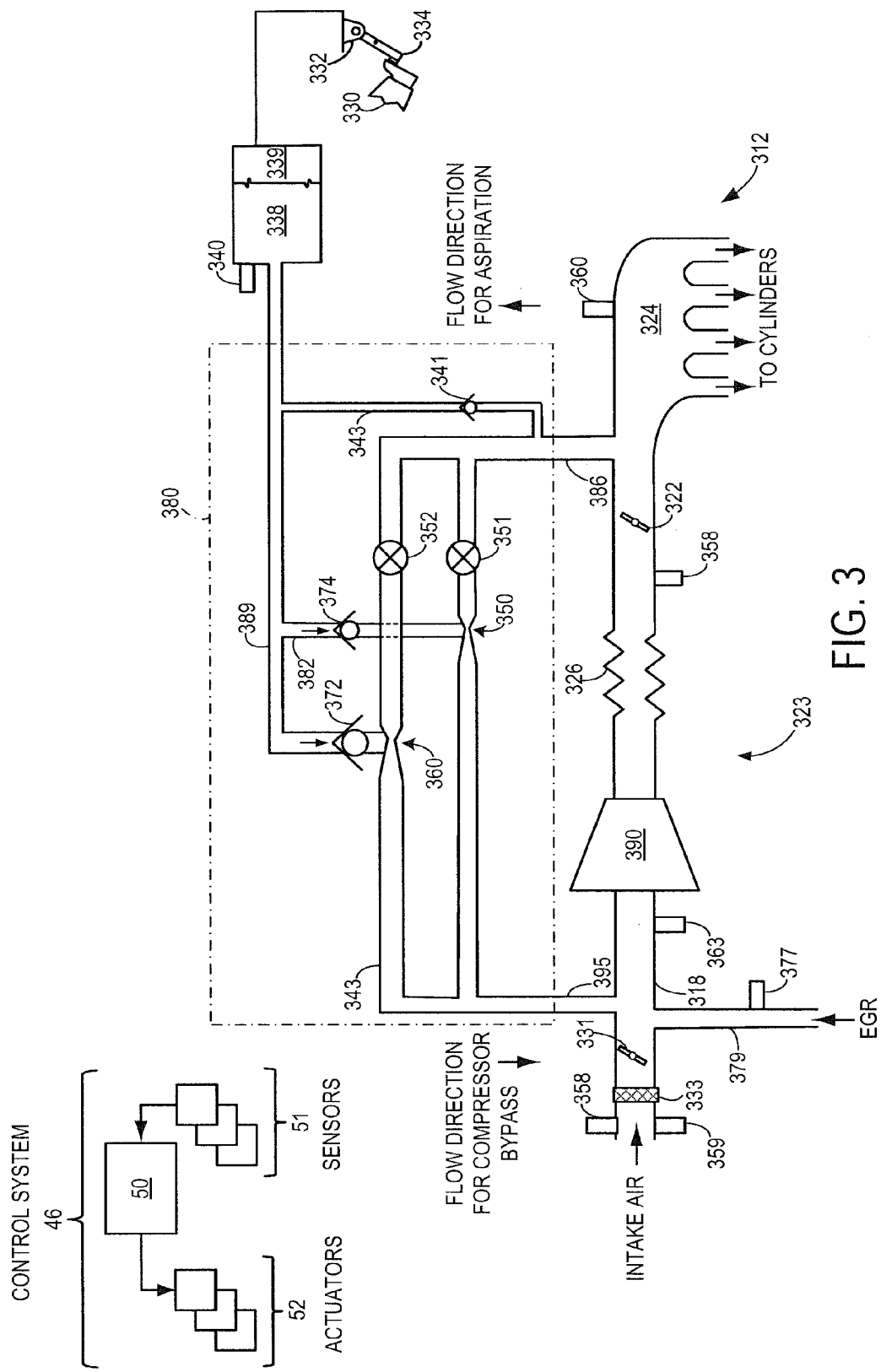
FIG. 3 shows a schematic diagram of a second embodiment of an example engine system including a parallel valved aspirator arrangement bypassing a boost device.

Methods and systems are provided for controlling a motive flow rate through a parallel arrangement of valved aspirators bypassing a boost device arranged in an intake of an engine system such as the engine systems depicted in FIGS. 1 and 3. A detail view of an exemplary aspirator arrangement which may be included in the engine system of FIG. 1 is provided in FIG. 2, a detail view of an exemplary aspirator arrangement which may be included in the engine system of FIG. 3 is provided in FIG. 4, and a detail view of an exemplary aspirator arrangement which may be included in either of the engine systems of FIGS. 1 and 3 is provided in FIG. 5. A graph depicting ideal engine air flow rate versus engine air flow rate achievable when flow is directed through an aspirator arrangement such as the aspirator arrangement shown in FIG. 2, during non-boost conditions, is provided in FIG. 6A. As noted above, a rate of level of flow through an aspirator arrangement may be varied, e.g. to one of a plurality of discrete levels, via control of respective aspirator shut-off valves (ASOVs) arranged in series with each aspirator of the aspirator arrangement. FIG. 6B depicts exemplary combined flow rate levels achievable through an aspirator arrangement for different ASOV positions, for an exemplary aspirator arrangement including exactly two aspirators. Depending on engine operating conditions, whether throttle fault conditions are present, and whether boost is active, various controls may be enacted to achieved a desired combined flow rate through an aspirator arrangement (e.g., see FIGS. 7-8). For example, a desired combined motive flow rate through an aspirator arrangement may be determined in accordance with the method of FIG. 9 (applicable to the aspirator arrangement depicted in FIG. 2) or the method of FIG. 10 (applicable to the aspirator arrangement depicted in FIG. 4). The desired combined motive flow rate through the aspirator arrangement may depend upon MAP during non-boost conditions, whereas it may depend upon a level of compressor surge during boost conditions. Positions/states of the ASOVs for the aspirators of an aspirator arrangement may then be controlled to achieve the desired combined motive flow rate, for example in the manner depicted in the method of FIG. 11. Advantageously, the aspirator arrangements and control methodologies described herein enable selectable, discrete levels of compressor bypass flow and compressor recirculation flow which serve the further function of generating vacuum for use by various vacuum consumers of the engine system.

Turning to FIG. 1, it shows a first embodiment of an engine system 10 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 includes an engine intake system 23. Intake system 23 includes an air induction system (AIS) throttle 31 and main air intake throttle 22 fluidly coupled to an engine intake manifold 24 along an intake passage 18. Air may enter intake passage 18 from an air intake system including an air filter 33 in communication with the vehicle's environment. A position of AIS throttle 31 may be varied by a controller 50 via a signal provided to an electric motor or actuator included with the AIS throttle 31 and a position of main throttle 22 may be varied by a controller 50 via a signal provided to an electric motor or actuator included with the main throttle 22, a configuration that is commonly referred to as electronic throttle control. In this manner, AIS throttle 31 may be operated to vary the compressor inlet pressure, and to vary the proportion of intake air continuing in intake passage 18 to intake air traveling through a parallel valved aspirator arrangement bypassing a turbocharger compressor, as will be detailed below. Similarly, main throttle 22 may be operated to vary the intake air provided to the intake manifold and the plurality of engine cylinders from downstream of a boosting device, and to vary the proportion of intake air flowing back to the intake passage upstream of the boosting device during certain conditions, as will be detailed below.

Whereas motorized throttles are often designed to default to a 6° or 7° open position when unpowered, for example so that the engine may receive enough air flow to complete a current trip even in the case of failure of the electronic throttle control (sometimes referred to as "limp home" operation), AIS throttle 31 and/or main throttle 22 may have a fully closed default position. A fully closed default position may be used in conjunction with the parallel valved aspirator arrangement described herein because the combined motive flow through the arrangement may be sufficient in the case of electronic throttle control failure (e.g., the combined motive flow rate of the aspirator arrangement may be 7.5 grams per second (g/s) in one non-limiting example). In this way, the costly partially open unpowered position of one or both of the throttles may be eliminated. As a further advantage over the partially open unpowered position of the AIS throttle and/or main throttle, the parallel valved aspirator arrangement provides multiple airflow levels for use during the fault mode, depending on the number of aspirators in the arrangement/flow geometries of the aspirators/orientation of the aspirators, providing better performance during limp home operation.

In the example embodiment shown in FIG. 1, mass air flow (MAF) sensor 58 is coupled in intake passage 18 for providing signals regarding mass air flow in the intake passage to controller 50. In the depicted example, MAF sensor 58 provides a signal regarding mass air flow at the inlet of intake passage 18, upstream of AIS throttle 31. However, it will be appreciated that the MAF sensors may be coupled elsewhere in the intake system or engine system, and further, there may be a plurality of MAF sensors arranged in the intake system or engine system.

A sensor 60 may be coupled to intake manifold 24 for providing a signal regarding manifold air pressure (MAP) and/or manifold vacuum (MANVAC) to controller 50. For example, sensor 60 may be a pressure sensor or a gauge sensor reading vacuum, and may transmit data as negative vacuum (e.g., pressure) to controller 50. A sensor 59 may be coupled to intake passage 18 upstream of the compressor, for providing a signal regarding barometric pressure (BP) to controller 50. A compressor inlet pressure (CIP) sensor 63 may be arranged downstream a junction of intake passage 18 and passage 95 and upstream of the compressor. CIP sensor 63 may provide a signal regarding CIP to controller 50.

In some examples, additional pressure/vacuum sensors may be coupled elsewhere in the engine system to provide signals regarding pressure/vacuum in other areas of the engine system to controller 50.

As shown, engine system 10 is a boosted engine system including a boosting device. In the present example, the boosting device is a compressor 90 for boosting an intake air charge received along intake passage 18. A charge air cooler (or intercooler) 26 is coupled downstream of compressor 90 for cooling the boosted air charge before delivery to the intake manifold. In embodiments where the boosting device is a turbocharger, compressor 90 may be coupled to and driven by an exhaust turbine (not shown). Further, compressor 90 may be, at least in part, driven by an electric motor or the engine crankshaft.

Engine system 10 further includes a parallel valved aspirator arrangement 180. In the depicted embodiment, for the sake of example, aspirator arrangement 180 includes two aspirators, aspirators 150 and 160; however, it will be appreciated that aspirator arrangement 180 may include more than two aspirators (e.g., three, four, five, six, or more aspirators) arranged in parallel without departing from the scope of this disclosure. One or both of aspirators 150 and 160 may be ejectors, aspirators, eductors, venturis, jet pumps, or similar passive devices. Each aspirator of aspirator arrangement 180 is a three-port device including a motive inlet, a mixed flow outlet, and an entraining inlet arranged at a throat of the aspirator. For example, as may be seen in the detail view of FIG. 2, aspirator 150 may include a motive inlet 153, a mixed flow outlet 157, and a throat/entraining inlet 165. Similarly, aspirator 160 includes a motive inlet 154, a mixed flow outlet 156, and a throat/entraining inlet 167. As described further below, motive flow through each aspirator generates suction flow at the entraining inlet of the aspirator, thereby generating vacuum, e.g. which may be stored in a vacuum reservoir and provided to various vacuum consumers of the engine system. In the embodiments depicted herein, the aspirators are asymmetrical; a flow geometry of a converging portion of each aspirator is different from a flow geometry of a diverging portion of the aspirator in a way that maximizes vacuum generation when motive flow enters the motive inlet of the aspirator and exits the mixed flow outlet of the aspirator (which may be referred to as "forward flow" through the aspirator). For example, as seen in FIG. 2, the converging portion of the aspirator may include a frustoconical section with sides having a first length oriented at a first angle from a motive flow axis of the aspirator, and the diverging portion of the aspirator may include a frustoconical section with sides having a second length oriented at a second angle from the motive flow axis of the aspirator, where the second length is greater than the first length and the second angle is smaller than the first angle. However, depending on the design of the aspirator, a lower level of vacuum may still be generated when motive flow travels through the aspirator in the opposite direction (e.g., when motive flow enters the mixed flow outlet and leaves the motive inlet, which may be referred to as "reverse flow" through the aspirator), due to the venturi effect. In other examples, however, the aspirators may be symmetrical such that their vacuum generation capability is identical regardless of whether motive flow enters the motive inlet and leaves the mixed flow outlet or enters the mixed flow outlet and leaves the motive inlet (e.g., identical vacuum generation capability during forward flow and reverse flow). In such examples, the lengths of the sides of frustoconical sections constituting the converging and diverging portions of the aspirator may be identical, and the angles at which the sides of the converging and diverging portions are oriented may be identical as well.

An ASOV is arranged in series with each aspirator of aspirator arrangement 180. In the embodiment depicted in FIG. 1, ASOV 151 is arranged in series with and upstream of aspirator 150, and ASOV 152 is arranged in series with and upstream of aspirator 160. Specifically, ASOV 151 is arranged upstream of motive inlet 153 of aspirator 150 and downstream of a motive inlet 145 of aspirator arrangement 180, and similarly, ASOV 152 is arrangement upstream of motive inlet 154 of aspirator 160 and downstream of motive inlet 145 of aspirator arrangement 180. However, it will be appreciated that in other embodiments, the ASOVs may be arranged downstream of mixed flow outlets of the aspirators, or the ASOVs may be integral to the aspirators (e.g., the valves may be arranged at the throats of the aspirators). One advantage of positioning an ASOV upstream of the motive inlet of a corresponding aspirator is that when the ASOV is upstream (e.g., during forward flow through the aspirator), the pressure loss associated with the ASOV has less of an impact as compared to a configuration where the ASOV is downstream of the aspirator (either positioned in series with the mixed flow outlet of the aspirator during forward flow or positioned in series with the motive inlet of the aspirator during reverse flow), or when the ASOV is integral to the aspirator.

In the embodiments described herein, ASOVs 151 and 152 are solenoid valves which are actuated electrically, and the state of each ASOV may be controlled by controller 50 based on various engine operating conditions. However, as an alternative, the ASOVs may be pneumatic (e.g., vacuum-actuated) valves; in this case, the actuating vacuum for the valves may be sourced from the intake manifold and/or vacuum reservoir and/or other low pressure sinks of the engine system. For example, because it may be advantageous to increase a combined flow through the aspirator arrangement as intake manifold pressure increases during non-boost conditions (e.g., while BP/CIP is greater than MAP) as described herein, it may be advantageous to use vacuum-actuated ASOVs which are actuated based on intake manifold vacuum. Actuation thresholds of such vacuum-actuated valves may be different for different aspirators to achieve different desired combined flow levels through the aspirator arrangement. In embodiments where the ASOVs are pneumatically-controlled valves, control of the ASOVs may be performed independent of a powertrain control module (e.g., the ASOVs may be passively controlled based on pressure/vacuum levels within the engine system).

Whether they are actuated electrically or with vacuum, ASOVs 151 and 152 may be either binary valves (e.g. two-way valves) or continuously variable valves. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with continuously variable ASOVs may provide greater flexibility in control of the combined motive flow rate of the aspirator arrangement, with the drawback that continuously variable valves may be much more costly than binary valves. Because of the various discrete flow levels which are achievable by the aspirator arrangement described herein, cheaper binary valves may be used and yet flexibility closer to that of a continuously variable valve may still be achieved.

In other examples, ASOVs 151 and 152 may be gate valves, pivoting plate valves, poppet valves, or another suitable type of valve.

As detailed herein (e.g., with respect to FIG. 11), the states of valves 151 and 152 may be adjusted based on various engine operating conditions, to thereby vary a combined motive flow (e.g., a combined motive flow amount and/or rate) through the aspirator arrangement. Depending on the relationship between BP and MAP (or CIP and MAP in the embodiment of FIGS. 3-4), the motive flow through the aspirator arrangement may be a forward flow, where the motive flow enters the motive inlet of the aspirator arrangement and leaves the mixed flow outlet of the aspirator arrangement, or a reverse flow, where the motive flow enters the mixed flow outlet of the aspirator arrangement and leaves the motive inlet of the aspirator arrangement. As used herein, a state of a valve may be fully open, partially open (to varying degrees), or fully closed. In one example, as described herein with respect to FIG. 9, the state of each ASOV may be adjusted based on intake manifold pressure (e.g., such that the combined flow through the aspirator arrangement increases with increasing intake manifold pressure). In another example, as described herein with respect to FIG. 10, the state of each ASOV may be adjusted based on compressor surge (e.g., such that the combined flow through the aspirator arrangement increases with increasing compressor surge). It will be appreciated that references to adjustment of the ASOVs may refer to either active control via controller 50 (e.g., as in the embodiment depicted in FIG. 1 where the ASOVs are solenoid valves) or passive control based on vacuum actuation thresholds of the ASOVs themselves (e.g., in embodiments where the ASOVs are vacuum-actuated valves). Alternatively or additionally, the states of the ASOVs may be adjusted based on a level of vacuum stored in vacuum reservoir 38, e.g. to increase a combined flow through the aspirator arrangement responsive to an urgent need for vacuum replenishment when such operation is permissible in view of current engine operating conditions. Thus, by varying the motive flow through the aspirators 150 and 160 via adjustment of the state of ASOVs 151 and 152, an amount of vacuum drawn at the entraining inlets of the aspirators may be modulated to meet engine vacuum requirements.

In the example embodiment depicted in FIG. 1, a passage 95 couples aspirator arrangement 180 with intake passage 18 at a point upstream of AIS throttle 31. As shown, passage 95 branches into parallel flow paths, each flow path including one aspirator of the aspirator arrangement; a portion of passage 95 upstream of the branching point will be referred to herein as the motive inlet 145 of aspirator arrangement 180 (see FIG. 2). Further, as shown in FIG. 1, a passage 86 couples aspirator arrangement 180 with intake manifold 24 (e.g., passage 86 couples aspirator arrangement 180 with intake passage 18 downstream of main throttle 22 proximal to intake manifold 24). As shown, the parallel flow paths containing the aspirators of the aspirator arrangement merge at passage 86; a portion of passage 86 downstream of the merging point will be referred to herein as mixed flow outlet 147 of aspirator arrangement 180 (see FIG. 2). Thus, it will be appreciated that while each individual aspirator is a three-port device including a motive inlet, a mixed flow outlet, and a throat/entraining inlet, the aspirator arrangement itself also has a motive inlet and a mixed flow outlet.

Depending on various engine operating conditions, fluid flow may travel in a forward direction ("forward flow") or in a reverse direction ("reverse flow") through the aspirator arrangement. Herein, forward flow refers to fluid flow from the motive inlet of the aspirator arrangement to the mixed flow outlet of the aspirator arrangement via one or more of the parallel aspirators, whereas reverse flow refers to fluid flow from the mixed flow outlet of the aspirator arrangement to the motive inlet of the aspirator arrangement via one or more of the parallel aspirators. During forward flow, more vacuum may be generated by the aspirator arrangement than during reverse flow, as the aspirators may be have asymmetrical geometries which provide enhanced vacuum generation during forward flow. Nonetheless, depending on the geometries of the aspirators, a lower level of vacuum may still be generated during reverse flow. In other examples, the aspirators may have symmetrical geometries such that vacuum generation levels are substantially equal during both forward and reverse flow through the aspirator arrangement.

As will be detailed below with regard to FIGS. 7 and 8, in the embodiment depicted in FIGS. 1-2, the fluid flow direction through the aspirator arrangement may depend on the pressure differential between the atmosphere (e.g., BP) and the intake manifold (MAP). For example, when BP is greater than MAP (e.g., when boost conditions are not present), some amount of forward flow through the aspirator arrangement may occur depending on other engine operating parameters such as AIS throttle position, main throttle position, ASOV states, etc. During forward flow, fluid flow entering the motive inlet of the aspirator arrangement may be diverted through one or more of the aspirators of the aspirator arrangement depending on the positions of the ASOVs. A mixture of the fluid flow from the motive inlet and the suction flow entering each aspirator through its entraining inlet ("mixed flow") exits the mixed flow outlet of the aspirator and combines with the mixed flow of the other aspirators of the aspirator arrangement before exiting the aspirator arrangement via the mixed flow outlet 147 of the aspirator arrangement.

In contrast, when BP is less than MAP, boost conditions may be present (e.g., the compressor may be operating and compressing intake air so as to raise the pressure of intake air from BP to a higher pressure). During such conditions, the ASOVs may be controlled such that the aspirator arrangement functions as a continuous compressor bypass passage with discrete levels. For example, during boost, reverse flow through the aspirator arrangement may occur if one or more of the ASOVs of the aspirator arrangement is controlled to be at least partially open. During reverse flow, fluid flow entering the mixed flow outlet of the aspirator arrangement may be diverted through one or more of the aspirators depending on the positions of the ASOVs. A mixture of the fluid flow from the mixed flow outlet and the suction flow entering each aspirator through its entraining inlet ("mixed flow") exits the motive inlet of the aspirator and combines with the mixed flow of the other aspirators of the aspirator arrangement before exiting the aspirator arrangement via the motive inlet 145 of the aspirator arrangement. Thus, in contrast to engine systems wherein a separate, standalone compressor recirculation passage is provided for compressor surge control, here the aspirator arrangement itself may function as a compressor recirculation passage. That is, to reduce compressor surge, such as on a driver tip-out, boost pressure may be dumped from the intake manifold, downstream of main throttle 22, through aspirator arrangement 180 and back to intake passage 18 (for example, downstream of air filter 33 and upstream of AIS throttle 31 as shown in FIG. 1). By flowing boosted air from downstream of the compressor back to the intake passage upstream of the compressor via the aspirator arrangement, boost pressure may be reduced. Reverse flow through aspirator arrangement 180 may be regulated via control of the ASOVs (e.g., ASOVs 151 and 152 in FIGS. 1-2), as detailed herein with reference to FIGS. 7 and 9-11. For example, the state of the ASOVs may determine the mass flow that is allowed to recirculate around the compressor. This allows a metered amount of air to recirculate, providing compressor operation at a more favorable point on the compressor map.

As noted above, depending on the geometry of the aspirators in the aspirator arrangement and the flow rate, among other factors, some vacuum generation may result from the reverse flow through the aspirators. Accordingly, even during reverse flow, vacuum generation may occur and the generated vacuum may be used by various vacuum-powered devices of the engine system. Further, as will be described below with respect to FIG. 10, when there is an urgent need for vacuum replenishment during boost, the ASOVs may be controlled to provide the highest combined motive flow rate possible through the aspirator arrangement, thereby replenishing vacuum as quickly as possible via reverse flow through the aspirator arrangement.

While the example engine system depicted in FIG. 1 includes an aspirator arrangement coupled to the intake passage downstream of air filter 33 and upstream of AIS throttle 31 and downstream of main throttle 22, it will be appreciated that the motive inlet of an aspirator arrangement such as aspirator arrangement 180 may alternatively be coupled to another part of the intake passage upstream of the compressor (e.g., it may be coupled upstream of air filter 33, downstream of AIS throttle 31, etc.). Further, the mixed flow outlet of an aspirator arrangement such as aspirator arrangement 180 may alternatively be coupled to another part of the intake passage downstream of the compressor (e.g., upstream of main throttle 22, upstream of charge air cooler 26, etc.) in some examples. Alternatively, motive inlets of the individual aspirators of the aspirator arrangement may each be coupled to different parts of the intake passage upstream of the compressor while their mixed flow outlets are coupled to a same part of the intake passage downstream of the compressor.

Returning to the aspirators of aspirator arrangement 180, a throat flow area (e.g., a cross-sectional flow area through the throat of the aspirator) of the aspirators may be non-uniform in some examples. For example, as may be seen in the detail view of aspirator arrangement 180 depicted in FIG. 2, throat 161 of aspirator 150 has a diameter $d_1$, and throat 163 of aspirator 160 has a diameter $d_2$. As shown the diameter $d_1$ and the resulting cross-sectional flow area through aspirator 150 is smaller than the diameter $d_2$ and the resulting cross-sectional flow area through aspirator 160. In one example, the ratio of diameters $d_1$ to $d_2$ may be 3.5 to 5; in this case, $d_1$ may be 3.5 mm and $d_2$ may be 5 mm. With this ratio of diameters, the cross-sectional flow area at the throat of aspirator 150 is roughly half as large as the cross-sectional flow area at the throat of aspirator 160 (e.g., if $d_1$ and $d_2$ are 3.5 mm and 5 mm, respectively, the resulting cross-sectional flow areas at the throats of aspirators 150 and 160 are approximately 9.62 mm$^2$ and 19.63 mm$^2$, respectively). Such a relationship between throat flow areas of aspirators in the aspirator arrangement may advantageously provide greater flexibility for the combined motive flow through the aspirator, as detailed herein. In embodiments with greater than two aspirators in the aspirator arrangement, all of the aspirators of aspirator arrangement 180 may have different diameters/cross-sectional areas (e.g., none of the aspirators having the same diameter/cross-sectional flow area). Alternatively, in such embodiments, only some of the aspirators of the aspirator arrangement may have different diameters/cross-sectional flow areas (in which case at least two aspirators of the arrangement will have the same diameter/cross-sectional flow area). In further example aspirator arrangements having at least two aspirators, all of the aspirators of the aspirator arrangement may have the same, uniform diameter and cross-sectional flow area. It will be appreciated that in examples where cross-sections of the aspirators (e.g., at the throats of the aspirators) are not circular and are instead elliptical or rectangular, among other examples, it may not be relevant to refer to diameters of the aspirators; in such examples, other parameters may be referred to such as cross-sectional flow area.

Further, in some examples, each parallel flow path may itself branch into further parallel flow paths each containing one or more aspirators with either the same or different diameters/cross-sectional flow areas at their throats, e.g. downstream of the ASOV, which then merge into a single flow path upstream of the passage at which all of the parallel flow paths merge upstream of the intake manifold. Such configurations may provide further flexibility in controlling engine air flow rate and vacuum generation during forward flow, e.g. during a throttle fault condition during non-boosted conditions, where the throttle is in a fully closed position and all airflow is directed through the aspirator arrangement. Further, during reverse flow, such configurations may provide further flexibility in controlling a compressor bypass flow rate.

As previously mentioned, each aspirator of aspirator arrangement 180 includes an entraining inlet at the throat of the aspirator. In the example embodiment depicted in FIG. 1, throat/entraining inlet 165 of aspirator 150 communicates with a vacuum reservoir 38 by way of a passage 82. Due to the converging-diverging shape of aspirator 150, the flow of fluid such as air from motive inlet 154 to mixed flow outlet 156 of aspirator 150 (forward flow) may generate a low pressure at throat/entraining inlet 165. This low pressure may induce suction flow from passage 82 into throat/entraining inlet 165 of aspirator 150, thereby generating vacuum at vacuum reservoir 38. In some examples, depending on the geometry of the aspirator, the flow of fluid from mixed flow outlet 157 to motive inlet 153 (reverse flow) may also generate a low pressure which induces a suction flow into the aspirator's throat and generates vacuum at the vacuum reservoir. As noted above, for aspirators with geometries that are symmetrical about the throat, a level or rate of vacuum generated may be substantially equal for both reverse flow and forward flow. In contrast, for aspirators with geometries that are asymmetrical about the throat, a level or rate of vacuum generated during forward flow may be higher than a level of vacuum generated or rate of vacuum generated during reverse flow, as the aspirators may be designed to generate vacuum during forward flow.

A check valve 72 arranged in passage 82 prevents backflow from aspirator 150 to vacuum reservoir 38, thereby allowing vacuum reservoir 38 to retain its vacuum should the pressures at the motive inlet of aspirator 150 and the vacuum reservoir equalize. While the depicted embodiment shows check valve 72 as a distinct valve, in alternate embodiments, check valve 72 may be integrated into the aspirator. As described above for aspirator 150, throat/entraining inlet 167 of aspirator 160 communicates with vacuum reservoir 38 by way of a passage 84, and motive flow through aspirator 160 may induce a suction flow from passage 84 into throat/entraining inlet 167 of aspirator 160, thereby generating vacuum at vacuum reservoir 38. Like check valve 72 described above, a check valve 74 arranged in passage 84 prevents backflow from aspirator 160 to vacuum reservoir 38.

It will be appreciated that because mixed flow outlet 147 of aspirator arrangement 180 communicates with intake manifold 24, check valves 72 and 74 prevent fluid flow from the intake manifold to the vacuum reservoir, e.g. which might otherwise occur during conditions when intake manifold pressure is higher than a pressure in the vacuum reservoir. Similarly, check valves 72 and 74 prevent fluid such as an intake air charge from flowing from passage 95 into vacuum reservoir 38. As shown in FIG. 1, passages 82 and 84 merge into a common passage 89 which enters vacuum reservoir 38. However, in other examples, passages 82 and 84 may each enter the vacuum reservoir at different ports.

Vacuum reservoir 38 may be coupled to one or more engine vacuum consumption devices 39. In one non-limiting example, a vacuum consumption device 39 may be a brake booster coupled to vehicle wheel brakes wherein vacuum reservoir 38 is a vacuum cavity in front of a diaphragm of the brake booster, as shown in FIG. 1. In such an example, vacuum reservoir 38 may be an internal vacuum reservoir configured to amplify a force provided by a vehicle operator 130 via a brake pedal 134 for applying vehicle wheel brakes (not shown). A position of the brake pedal 134 may be monitored by a brake pedal sensor 132. In alternate embodiments, the vacuum reservoir may be a low pressure storage tank included in a fuel vapor purge system, a vacuum reservoir coupled to a turbine wastegate, a vacuum reservoir coupled to a charge motion control valve, etc. In such embodiments, vacuum consumption devices 39 of the vehicle system may include various vacuum-actuated valves such as charge motion control valves, a 4×4 hub lock, switchable engine mounts, heating, ventilation and cooling, vacuum leak checks, crankcase ventilation, exhaust gas recirculation, gaseous fuel systems, wheel-to-axle disconnect, etc. In one example embodiment, anticipated vacuum consumption by the vacuum consumers during various engine operating conditions may be stored in a lookup table in memory of the control system, for example, and the stored vacuum threshold corresponding to anticipated vacuum consumption for current engine operating conditions may be determined by referencing the lookup table. In some embodiments, as depicted, a sensor 40 may be coupled to the vacuum reservoir 38 for providing an estimate of the vacuum level at the reservoir. Sensor 40 may be a gauge sensor reading vacuum, and may transmit data as negative vacuum (e.g., pressure) to controller 50. Accordingly, sensor 40 may measure the amount of vacuum stored in vacuum reservoir 38.

As shown, vacuum reservoir 38 may be directly or indirectly coupled to intake manifold 24 via a check valve 41 arranged in a bypass passage 43. Check valve 41 may allow air to flow to intake manifold 24 from vacuum reservoir 38 and may limit air flow to vacuum reservoir 38 from intake manifold 24. During conditions where the intake manifold pressure is negative, the intake manifold may be a vacuum source for vacuum reservoir 38. In examples where vacuum consumption device 39 is a brake booster, inclusion of the bypass passage 43 in the system may ensure that the brake booster is evacuated nearly instantaneously whenever intake manifold pressure is lower than brake booster pressure. While the depicted embodiment shows bypass passage 43 coupling common passage 89 with passage 86 in a region of mixed flow outlet 147 of the aspirator arrangement; other direct or indirect couplings of the intake manifold and the vacuum reservoir are also anticipated.

While not depicted in FIG. 1, engine system 10 includes an exhaust system, and a portion of exhaust leaving the cylinders of engine 12 may be recirculated from the exhaust system to intake passage 18, either upstream of the compressor (referred to as low pressure exhaust gas recirculation or LP EGR) or downstream of the compressor (referred to as high pressure exhaust gas recirculation or HP EGR). For example, recirculated exhaust may travel from the exhaust system to intake passage 18 by way of an EGR passage 79. In the embodiment depicted in FIG. 1, EGR passage 79 is coupled with intake passage 18 downstream of a juncture of passage 95 and intake passage 18 and upstream of compressor 90. As shown, AIS throttle 31 is arranged upstream of a juncture of intake passage 18 and EGR passage 79; adjustment of AIS throttle 31 may modify the pressure level at that point in the intake passage to thereby modify a flow rate of EGR into the intake passage. An EGR MAF sensor 77 may be coupled in EGR passage 79 for providing signals regarding mass air flow in the EGR passage to controller 50. In addition to or instead of MAF sensor 77, other sensors may be coupled elsewhere in the EGR passage.

Figure 4:
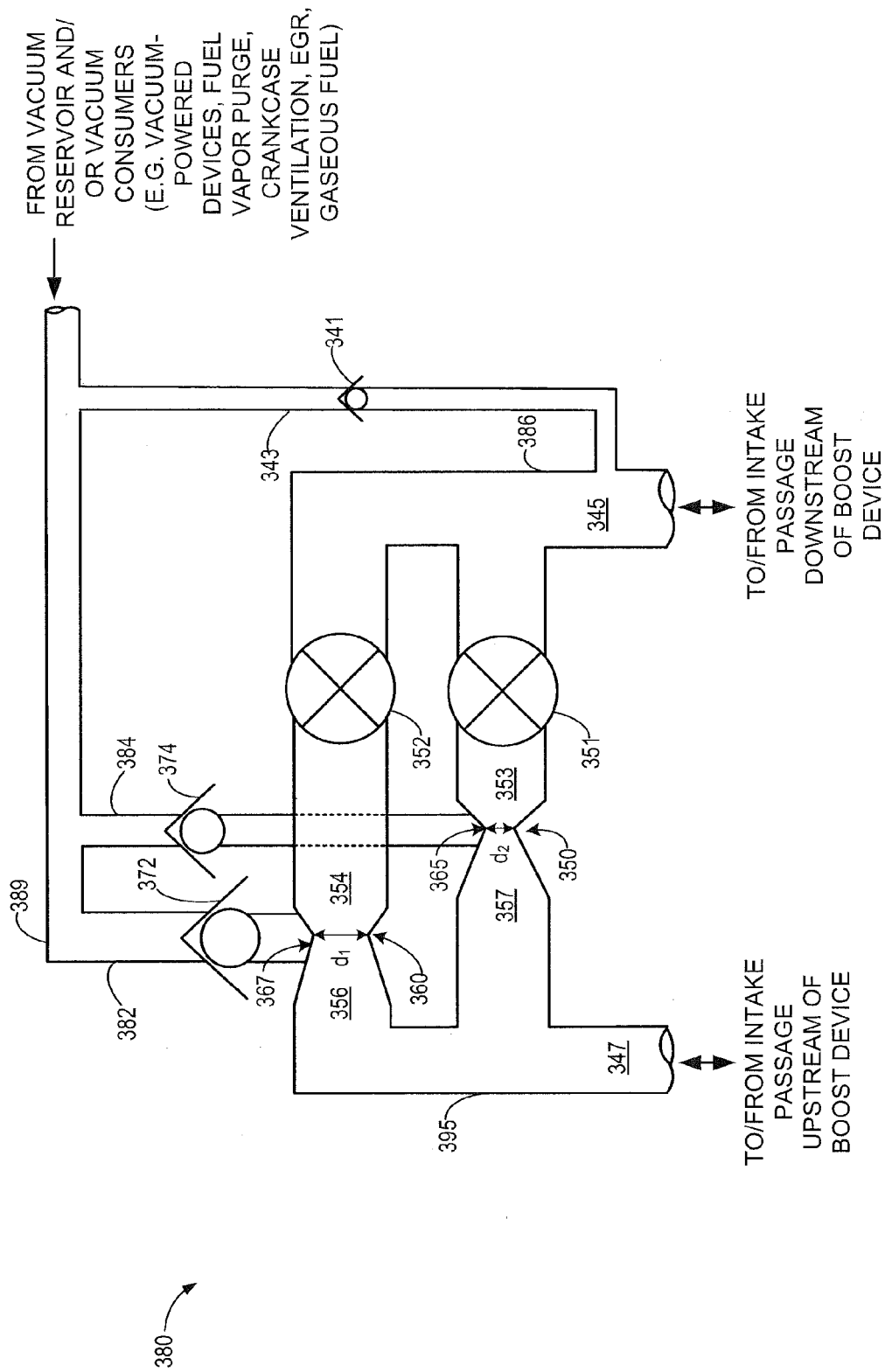
FIG. 4 shows a detail view of an aspirator arrangement which may be included in the engine system of FIG. 3.

A second embodiment of an engine system including a parallel valved aspirator arrangement is depicted in FIGS. 3-4. The second embodiment includes many of the same features described above for the first embodiment; similar features are numbered similarly and will not be described again for the sake of brevity.

One difference between the first embodiment and the second embodiment is that in the second embodiment, aspirator arrangement 380 is coupled to intake passage 318 downstream of AIS throttle 331 and upstream of compressor 390. Further, as shown, the aspirators in aspirator arrangement 380 are oriented such that their motive inlets (and, consequently, the motive inlet 345 of the aspirator arrangement) are coupled to the intake passage downstream of main throttle 322, at intake manifold 324. The mixed flow outlets of the aspirators in aspirator arrangement 380 (and, consequently, the mixed flow outlet 347 of the aspirator arrangement) are coupled to the intake passage intermediate AIS throttle 331 and compressor 390. Accordingly, in the second embodiment, vacuum generation is maximized when fluid flows from the intake passage downstream of the compressor to the intake passage upstream of the compressor, which is commonly referred to as compressor bypass flow or compressor recirculation flow. It follows that in the second embodiment, forward flow through aspirator arrangement 380 refers to flow originating downstream of compressor 390, entering motive inlet 345 of aspirator arrangement 380, and exiting the mixed flow outlet 347 of aspirator arrangement 380 which is fluidly coupled to the intake passage upstream of compressor 390. Similarly, reverse flow through aspirator arrangement 380 refers to flow originating upstream of compressor 390, entering mixed flow outlet 347 of aspirator arrangement 380, and exiting motive inlet 345 of aspirator arrangement 380 which is fluidly coupled to the intake manifold (e.g., fluidly coupled to intake passage 318 downstream of main throttle 322).

As in the first embodiment, ASOVs 351 and 352 are arranged in series with the motive inlets of aspirators 350 and 360, respectively. However, in other embodiments, the ASOVs may be arranged downstream of mixed flow outlets of the aspirators, or the ASOVs may be integral to the aspirators (e.g., the valves may be arranged at the throats of the aspirators).

Further, as in the first embodiment, a CIP sensor 363 may be arranged downstream a junction of intake passage 318 and passage 395, and upstream of the compressor. CIP sensor 363 may provide a signal regarding CIP to controller 50. Because of the configuration of engine system 310, CIP, rather than BP, may correspond to the pressure at the junction of intake passage 318 and passage 395.

Because forward flow through aspirator arrangement 380 constitutes flow downstream of the compressor to upstream of the compressor, aspirator arrangement 380 may provide compressor bypass flow during forward flow conditions while generating vacuum. Accordingly, compressor surge as well as engine system vacuum needs may factor into the control strategy used for the ASOVs of the aspirator arrangement. For example, ASOVs 351 and 352 may be controlled to achieve a desired combined motive flow rate through the aspirator arrangement while generating vacuum for use by vacuum consumers of the engine system such as a brake booster, for example. The desired combined motive flow rate may be based on one or more of compressor surge (e.g., pressure ratio across the compressor), desired engine air flow rate, engine vacuum needs (e.g., level of stored vacuum and/or current vacuum requests), etc.

It will be appreciated that certain engine operating conditions may need to be present for forward flow through aspirator arrangement 380 to be enabled; for example, it may be necessary that MAP is greater than CIP. During such conditions, because MAP is relatively high, the intake manifold may not be able to provide vacuum for vacuum consumers of the engine system; accordingly, it may be especially advantageous to direct compressor bypass flow through the aspirator arrangement, thereby generating vacuum.

Depending on the geometries of the aspirators, as discussed above, reverse flow through the aspirator arrangement may also provide some vacuum generation (albeit less vacuum generation as compared to forward flow through the aspirator arrangement). Accordingly, even during conditions where MAP is not greater than CIP (e.g., non-boost conditions), it may be desirable to direct some intake air as reverse flow through the aspirator arrangement. For example, the ASOVs may be controlled such that a desired amount of intake air enters the aspirator arrangement as reverse flow. The desired amount may be based on engine system vacuum needs and/or desired engine air flow rate, for example.

Figure 5:
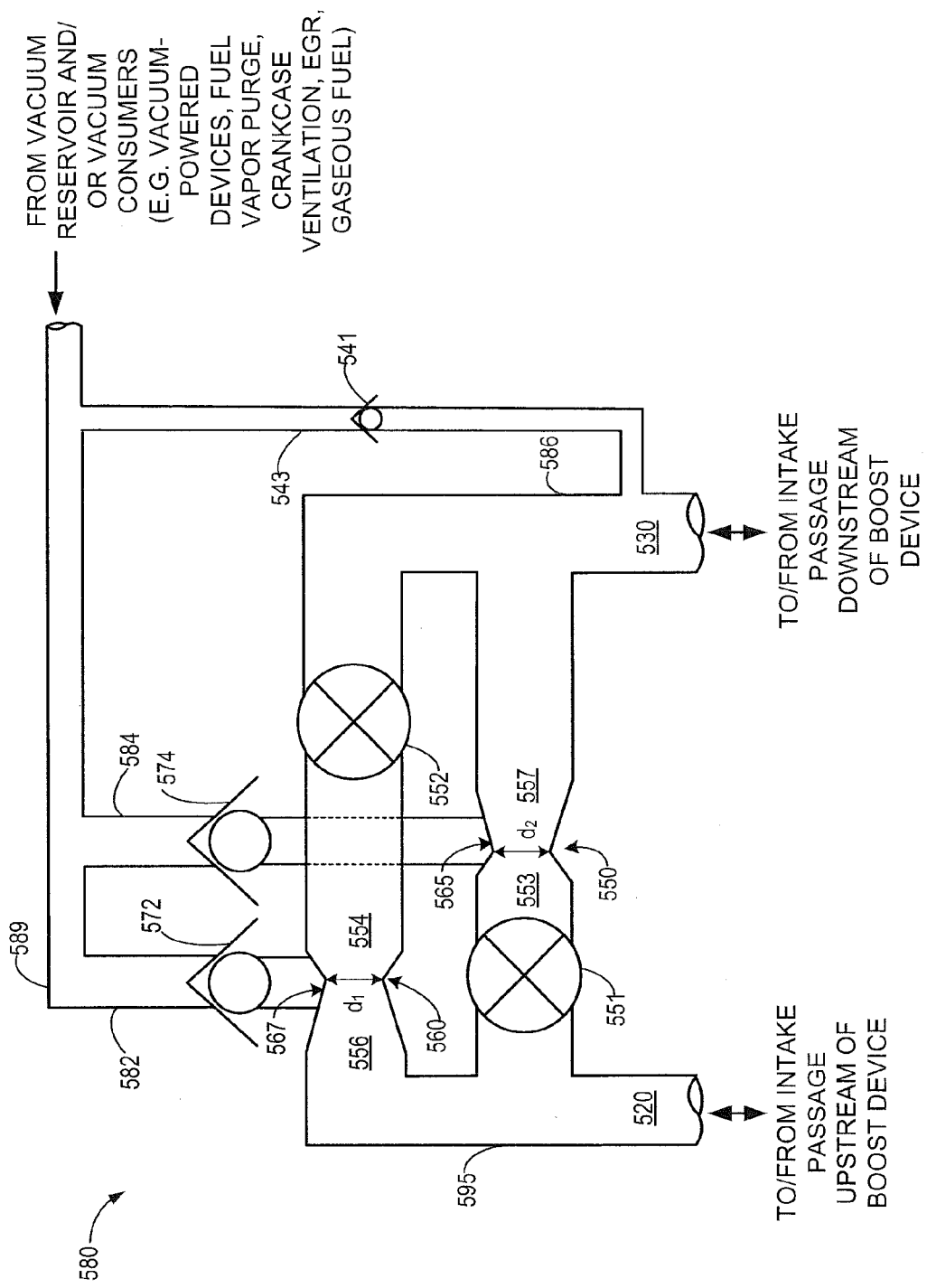
FIG. 5 shows a detail view of an aspirator arrangement which may be included in the engine system of either FIG. 1 or FIG. 3.

FIG. 5 depicts a third embodiment of a parallel valved aspirator arrangement 580. Aspirator arrangement 580 may be used in conjunction with engine system 10 of FIG. 1 or engine system 310 of FIG. 3, for example. The third embodiment includes many of the same features described above for the first and second embodiments; similar features are numbered similarly and will not be described again for the sake of brevity.

In contrast to the aspirator arrangements depicted in the detail views of FIGS. 2 and 4, aspirators 550 and 560 of aspirator arrangement 580 are oriented in opposite directions. That is, aspirator 550 is arranged such that its motive inlet 553 is fluidly coupled with the upstream side of the compressor and its mixed flow outlet 557 is fluidly coupled with the downstream side of the compressor, whereas aspirator 560 is arranged such that its motive inlet 554 is fluidly coupled with the downstream side of the compressor and its mixed flow outlet 556 is fluidly coupled with the upstream side of the compressor. While ASOVs 551 and 552 are arranged in series with the motive inlets of aspirators 550 and 560, respectively, in other examples, one or both of the ASOVs may be arranged in series with the mixed flow outlets of the aspirators, or in another configuration.

Unlike the aspirator arrangements depicted in FIGS. 2 and 4, aspirator arrangement 580 does not include a fixed motive inlet of the aspirator arrangement or a fixed mixed flow outlet of the aspirator arrangement, due to the non-uniform orientation of the aspirators in the arrangement. Instead, aspirator arrangement 580 includes area 520 within passage 595 and area 530 within passage 586. During boost conditions, intake air may recirculate from downstream of the compressor to upstream of the compressor when one or both of ASOVs 551 and 552 are open. For example, if both of the ASOVs are open, intake air may recirculate via both aspirators. In the depicted example, the aspirators have asymmetrical flow geometries, and thus reverse flow through an aspirator may generate less vacuum as compared to forward flow through the aspirator. Accordingly, due to the opposite orientation of the two aspirators in aspirator arrangement 580, recirculation flow through the aspirator arrangement may generate a first, higher amount of vacuum at aspirator 560 (which is experiencing forward flow during recirculation) and a second, lower amount of vacuum at aspirator 550 (which is experiencing reverse flow during recirculation). Similarly, during non-boost conditions when both ASOVs are open, a first, higher amount of vacuum may be generated at aspirator 550 (which is experiencing forward flow when intake air flows from upstream to downstream of the compressor) and a second, lower amount of vacuum may be generated at aspirator 560 (which is experiencing reverse flow when intake air flows from upstream to downstream of the compressor).

In contrast to the examples shown in FIGS. 2 and 4 wherein the aspirators have different diameters resulting in different cross-sectional flow areas, the aspirators shown in FIG. 5 may have a same diameter (e.g., $d_1=d_2$) and a same cross-sectional flow area. Alternatively, the aspirators may have different diameters (e.g., $d_1 \neq d_2$) and thus different cross-sectional flow areas, as in the examples shown in FIGS. 2 and 4.

Similar to the example aspirator arrangements depicted in FIGS. 2 and 4, aspirator arrangement 580 provides discrete levels of flow, and thus discrete levels of vacuum generation and compressor recirculation flow. However, because aspirator arrangement 580 includes oppositely-oriented aspirators, it will be appreciated that different flow rates and different levels of vacuum generation may be achieved as compared to the aspirator arrangements shown in FIGS. 2 and 4.

While aspirator arrangement 580 is shown with two aspirators in the depicted example, it will be appreciated that aspirator arrangement 580 includes at least two aspirators and therefore may include more aspirators. In such examples, at least two of the aspirators may have opposite orientations (e.g., where the motive inlet of one aspirator is fluidly coupled to a same portion of the intake passage to which the mixed flow outlet of another aspirator is fluidly coupled).

Figure 6A:
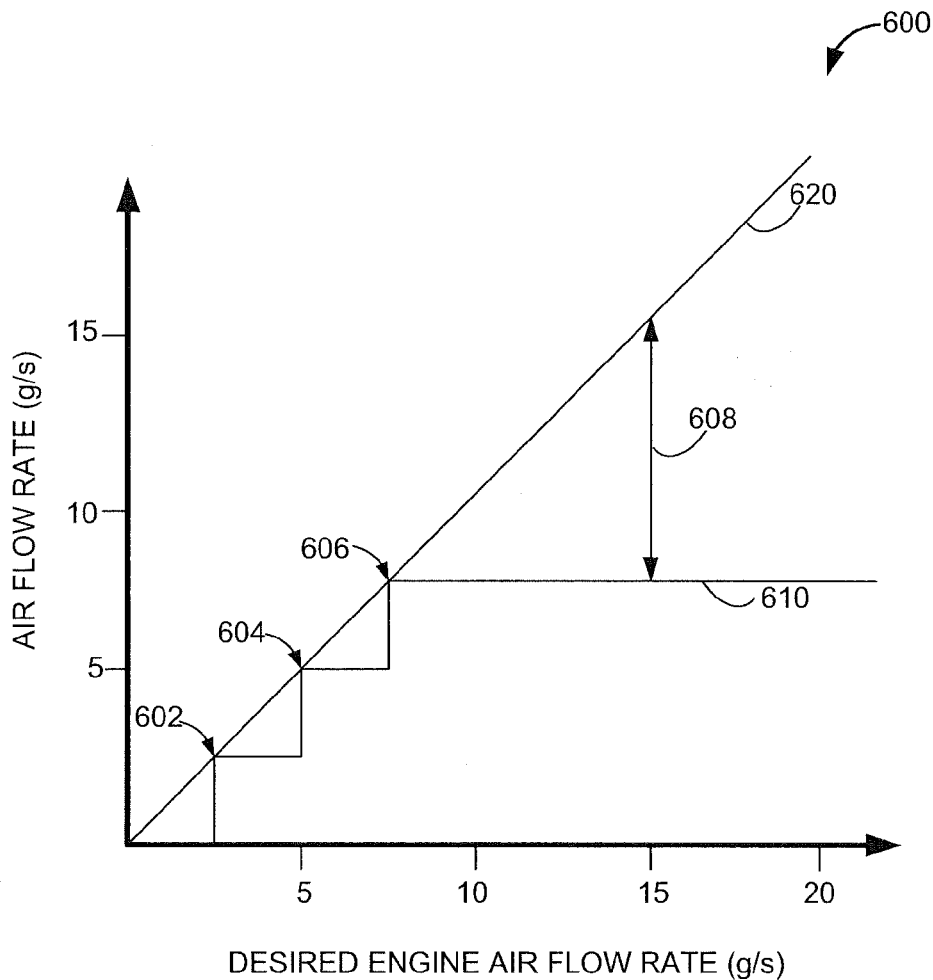
FIG. 6A shows a graph of an ideal performance of an aspirator arrangement and an actual performance of an exemplary aspirator arrangement as relates to engine air flow rate.
Figure 6B:
FIG. 6B shows a table relating aspirator shut-off valve position to a combined motive flow rate through an aspirator arrangement such as the aspirator arrangements depicted in FIG. 2 or FIG. 4.

FIG. 6A shows a graph 600 of an ideal performance characteristic of an aspirator arrangement as well as an actual performance characteristic of an aspirator arrangement including two parallel aspirators having throat flow areas in a ratio of 1:2, in a system such as the engine system of FIG. 1 (e.g., a system where the aspirator arrangement is oriented such that maximum vacuum generation through the aspirator arrangement when intake air bypasses the compressor from upstream of the compressor to downstream of the compressor). Graph 600 is applicable when BP is greater than MAP, such that when one or more of the ASOVs of the aspirator arrangement are open, intake air flows through the aspirator arrangement from upstream of the compressor to downstream of the compressor. The ideal performance characteristic is shown at 620, and the actual aspirator arrangement performance characteristic is shown at 610. The x-axis represents desired engine air flow rate (g/s), and the y-axis represents actual engine air flow rate (g/s). Desired engine air flow rate may be determined based on engine operating conditions, e.g. MAP/MANVAC, a torque request from a vehicle operator, brake pedal position, etc. Actual engine air flow rate may be measured and/or estimated based on signals from sensors such as MAF sensor 58 or based on various engine operating conditions (e.g., throttle position and positions of valves such as ASOVs). The numerical air flow rate values shown in graph 600 are for exemplary purposes only, and are non-limiting. Further, it will be appreciated that the dimensions of graph 600 are non-limiting; for example, instead of air flow rate, the axes could represent flow area (e.g., flow area of the main throttle and/or aspirator).

As may be seen, the ideal performance characteristic 620 has a constant slope (specifically, a slope of 1 in the depicted example). Thus, in the depicted example, actual engine air flow rate is equal to desired engine air flow rate at any given point on the characteristic. In contrast, the actual aspirator arrangement performance characteristic 610 includes "steps" corresponding to the opening/closing of the ASOVs corresponding to the two parallel aspirators. At points 602, 604, and 606 which are arranged at corners of the steps, characteristics 620 and 610 intersect; at these points, the performance of the aspirator arrangement is the same as the performance of an ideal aspirator arrangement for the corresponding desired engine air flow rate and actual engine air flow rate. For aspirator arrangements with more than two parallel aspirators, the steps on such a graph will be smaller (e.g., the more aspirators, the smaller the steps). The relative throat flow areas of the aspirators in an aspirator arrangement will also affect the size of the steps (and thus the frequency of intersection between the actual and ideal performance characteristics). In embodiments where the ASOVs are continuously variable valves, further fine-tuning of performance of the aspirator arrangement may be achieved such that the aspirator arrangement performance characteristic conforms still further to the ideal performance characteristic.

As shown in graph 600, actual aspirator arrangement performance characteristic 610 reaches a maximum at point 606 (corresponding to an actual engine air flow rate and desired engine air flow rate which is between 5 and 10 g/s). As will be described with reference to FIG. 6B, this maximum corresponds to a maximum combined flow rate through the aspirator arrangement when both aspirators are fully open. Accordingly, as the aspirator arrangement may not be able to provide an air flow rate surpassing this maximum valve, it may be necessary to allow at least some intake air to travel via another path from the intake passage upstream of the compressor to the intake passage downstream of the compressor (e.g., to the intake manifold). For example, if the aspirator arrangement is positioned as shown in FIG. 1, between the intake passage and intake manifold, it may be necessary to at least partially open the intake throttle such that a difference between the maximum combined flow rate through the aspirator and the desired engine air flow rate (e.g., the air flow rate which would ideally be achieved for the desired engine air flow rate), may be provided by air flow throttled by the intake throttle. For example, as shown in graph 600, when the desired engine air flow rate is 15 g/s, the actual engine air flow rate provided by the aspirator arrangement is between 5 and 10 g/s (e.g., the maximum combined flow rate). The arrow labeled 608 indicates a difference between the engine air flow rate achieved by an ideal aspirator arrangement at a desired engine air flow rate of 15 g/s and the engine air flow rate actually achieved by an exemplary aspirator arrangement at the same desired engine air flow rate. As will be described below with reference to FIG. 7, when the intake throttle is operating correctly, its position may be adjusted such that an air flow rate through the throttle may be added to the combined motive flow rate through the aspirator arrangement to achieve the desired engine air flow rate. Depending on engine operating conditions such as stored vacuum and current vacuum requests, and depending on whether it is desirable to prioritize engine air flow rate or to minimize throttling losses, it may be desirable to direct more or less intake air through the aspirator arrangement versus through the intake throttle.

FIG. 6B depicts a table 650 relating the positions of two ASOVs controlling fluid flow through aspirators with different-sized throat flow areas to the combined motive flow rate through the aspirator arrangement. Table 650 is directed to an embodiment where the aspirator arrangement includes exactly two aspirators in parallel, a first, smaller aspirator with a throat diameter of 3.5 mm and a second, larger aspirator with a throat diameter of 5 mm (which results in a throat flow area at the second aspirator which is approximately two times as large as a throat flow area at the first aspirator), where the two aspirators are oriented in the same direction such that forward flow through one aspirator occurs during forward flow through the other aspirator and reverse flow through one aspirator occurs during reverse flow through the other aspirator. Accordingly, FIG. 6B may be applicable to the examples depicted in FIGS. 1-4, but not the example depicted in FIG. 5, which includes oppositely-oriented aspirators. However, it will be appreciated that similar tables could be created for aspirator arrangements having a different number of aspirators and/or having aspirators with different relative throat diameters/cross-sectional flow areas. Further, table 650 may be applicable regardless of the direction of flow through the aspirator arrangement (e.g., during either reverse flow or forward flow through the arrangement), with the caveat that the value of the common factor λ described below may be different (e.g., larger) during forward flow versus reverse flow, depending on the geometries of the aspirators.

As shown in the first row of table 650, both ASOVs may be closed in certain conditions to achieve a combined motive flow through the aspirator arrangement of 0. Closing the ASOVs may be an active process in embodiments where the ASOVs are solenoid valves (e.g., the ASOVs may be controlled by a controller such as controller 50 of FIG. 1). Alternatively, in embodiments where the ASOVs are passive valves such as vacuum-actuated valves, each ASOV may be coupled to a vacuum source and may be opened/closed based on a vacuum level at the vacuum source; for example, the vacuum source may be the intake manifold and both ASOVs may be designed to be closed when intake manifold vacuum is greater than a threshold. At this time, all intake air flow may travel in the intake passage towards the intake manifold, and a position of the main throttle may be controlled based on a desired engine air flow rate.

As shown in the second row of table 650, the ASOV controlling the first, smaller aspirator may be open while the ASOV controlling the second, larger aspirator remains closed, resulting in a first level of combined motive flow rate through the aspirator arrangement. The first level of combined motive flow rate may correspond to point 602 of FIG. 6A, for example.

As shown in the third row of table 650, a second level of combined motive flow rate through the aspirator arrangement may be achieved by opening the ASOV corresponding to the second, larger aspirator and closing the ASOV corresponding to the first, smaller aspirator. The second level of combined motive flow rate may correspond to point 604 of FIG. 6A, for example.

As shown in the fourth row of table 650, a third level of combined motive flow rate may be achieved by opening both the ASOV corresponding to the second, larger aspirator and the ASOV corresponding to the first, smaller aspirator. The third level of combined motive flow rate may correspond to point 606 of FIG. 6A (e.g., it may correspond to the maximum combined flow rate described above).

Because of the 1:2 ratio of the cross-sectional flow areas at the throats of the aspirators of the example aspirator arrangement referred to in FIGS. 6A-B, the first, second, and third levels of forward flow rate may correspond to flow rates which are multiples of a common factor x. That is, the first level of combined forward motive flow rate may have a value x, the second level of combined forward motive flow rate may have a value of 2*x, and the third level of combined forward motive flow rate may have a value of 3*x. As noted above, in embodiments where the aspirators' geometries are designed to maximize vacuum generation for flow in one direction, the factor x during reverse flow through the aspirator arrangement may have a value less than the value of factor x during forward flow through the aspirator arrangement.

In examples where there is a different relationship between the cross-sectional flow areas of the throats of the aspirators of the aspirator arrangement, and in examples where a different number of aspirators are included in the aspirator arrangement, the mathematical relationship between the different flow rate levels achievable with the aspirator arrangement may be different, without departing from the scope of the present disclosure.

Figure 7:
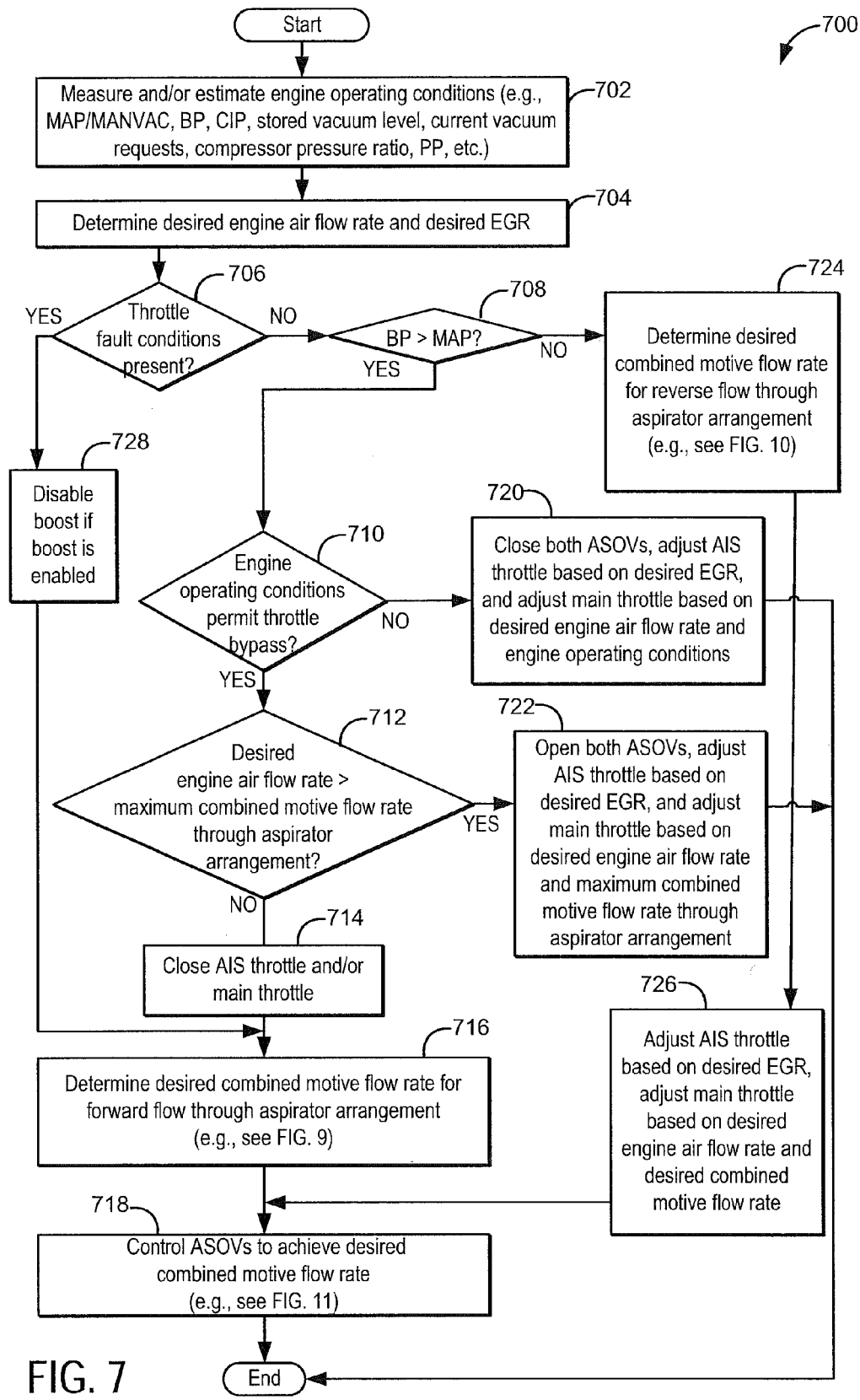
FIG. 7 shows a high level flow chart illustrating a routine that may be implemented in conjunction with the engine system of FIG. 1 and aspirator arrangement of FIG. 2 for controlling the operation of aspirator shut-off valves and intake throttles to achieve a desired combined motive flow rate through an aspirator arrangement.

Now referring to FIG. 7, an example method 700 for controlling the ASOVs and intake throttle(s) of the engine system of the first embodiment to achieve a desired combined motive flow rate through the aspirator arrangement is shown. The method of FIG. 7 may be used in conjunction with the first embodiment shown in FIGS. 1-2, the graph and table of FIGS. 6A-B, and the methods of FIGS. 9-11.

At 702, method 700 includes measuring and/or estimating engine operating conditions. Engine operating conditions may include, for example, MAP/MANVAC, BP, CIP, vacuum needs (e.g., based on a level of vacuum stored in the vacuum reservoir and/or current vacuum requests), engine load, engine speed, engine temperature, exhaust gas composition, catalyst temperature, compressor surge (e.g., based on sensed compressor pressure ratio), boost level, PP, MAF, ambient conditions (temperature, pressure, humidity.), etc.

After 702, method 700 proceeds to 704. At 704, method 700 includes determining desired engine air flow rate and desired exhaust gas recirculation (EGR). For example, desired engine air flow rate may be determined based on engine operating conditions, e.g. MAP/MANVAC, a torque request from a vehicle operator, brake pedal position, etc. Desired EGR may be based on engine load, engine speed, exhaust gas composition, etc.

After 704, method 700 continues to 706. At 706, method 700 includes determining whether throttle fault conditions are present. In one non-limiting example, controller 50 may set a flag when diagnostic procedures indicate failure of the electronic throttle control system, and the determination of whether throttle fault conditions are present may include checking whether this flag is set. Alternatively, the determination may be made based on readings from the MAP sensor, MAF sensor(s), and/or various other sensors.

If the answer at 706 is NO, this indicates that throttle fault conditions are not present (e.g., electronic throttle control is functioning correctly), and method 700 proceeds to 708. At 708, method 700 includes determining whether BP is greater than MAP. This determination may be made at controller 50 based on signals received from BP sensor 59 and MAP sensor 60, for example. The relationship between BP and MAP may determine whether forward flow or reverse flow through the aspirator arrangement is achievable via control of the state of the ASOVs.

If the answer at 708 is YES, indicating that BP is greater than MAP, method 700 proceeds to 710. At 710, method 700 includes determining whether engine operating conditions permit throttle bypass. For example, during certain engine operating conditions, engine air flow requirements may be such that it necessary to maintain a fully open throttle with no throttle bypass. Alternatively, during other engine operating conditions, it may be desirable to divert intake air flow through an aspirator arrangement to thereby generate vacuum for consumption by vacuum consumers of the engine system while avoiding throttling losses.

If the answer at 710 is YES, indicating that engine operating conditions do permit throttle bypass, method 700 proceeds to 712 to determine whether the desired engine air flow rate (e.g., as determined at 704) is greater than a maximum combined motive flow rate through the aspirator arrangement. For example, as described above with reference to FIG. 6A, a maximum combined flow rate through the aspirator arrangement may be less than a desired engine air flow rate, and it may be necessary to allow some air flow to pass through the intake throttle to achieve the desired engine air flow rate.

If the answer at 712 is NO, the desired engine air flow rate is not greater than the maximum combined motive flow rate through the aspirator arrangement, and thus the AIS throttle and/or main throttle may be closed at 714, to enable all intake air to bypass the compressor. After 714, method 700 proceeds to 716 to determine a desired combined motive flow rate for forward flow through the aspirator arrangement, for example in accordance with the method shown in FIG. 9 and described below. After 716, method 700 proceeds to 718 to control the ASOVs to achieve the desired combined motive flow rate, for example in accordance with the method shown in FIG. 11. After 718, method 700 ends.

Returning to 712, if the desired engine air flow rate is greater than the maximum combined motive flow rate through the aspirator arrangement, the answer is YES, and method 700 proceeds to 722. At 722, method 700 includes opening both ASOVs, adjusting the AIS throttle based on the desired EGR (e.g., as determined at step 704), and adjusting the main throttle based on the desired engine air flow rate and the maximum combined motive flow rate through the aspirator arrangement. This may include increasing opening of the AIS throttle to increase EGR, or decreasing opening of the AIS throttle to decrease EGR. A current amount of EGR may be determined based on a signal from EGR MAF sensor 77, for example. Further, as described above with reference to the graph shown in FIG. 6A, adjusting the main throttle based on the desired engine air flow rate and the maximum combined motive flow rate through the aspirator arrangement may include at least partially opening the intake throttle such that a difference between the maximum combined flow rate through the aspirator and the desired engine air flow rate may be provided by air flow throttled by the intake throttle. After 722, method 700 ends.

Returning to 710, if the answer is NO indicating that engine operating conditions do not permit throttle bypass (e.g., all intake air must pass through the throttle), method 700 proceeds to 720. Engine operating conditions may not permit throttle bypass during conditions where a wide open throttle position is necessary and where any lag associated with the flow restrictions of aspirators is unacceptable. As another example, if the control system diagnoses a fault in one or more of the ASOVs, this may constitute an engine operating condition wherein throttle bypass is not permitted. At 720, method 700 includes closing the ASOVs, adjusting the AIS throttle based on the desired EGR, and adjusting the main throttle based on the desired engine air flow rate and engine operating conditions. In some examples, this may include increasing opening of the throttle as a pressure exerted on an accelerator pedal by a vehicle operator increases (e.g., as indicated by PP). After 720, method 700 ends.

Returning to 708, if the answer is NO (e.g., indicating that the engine is operating with boost), method 700 proceeds to 724. At 724, method 700 includes determining a desired combined motive flow rate for reverse flow through the aspirator arrangement, for example in accordance with the method of FIG. 10.

After 724, method 700 proceeds to 726. At 726, method 700 includes adjusting the AIS throttle based on the desired EGR and adjusting the main throttle based on the desired engine air flow rate and the desired combined motive flow rate (e.g., similar to step 722). After 726, method 700 proceeds to 718 to control the ASOVs to achieve the desired combined motive flow rate, as described above.

Figure 8:
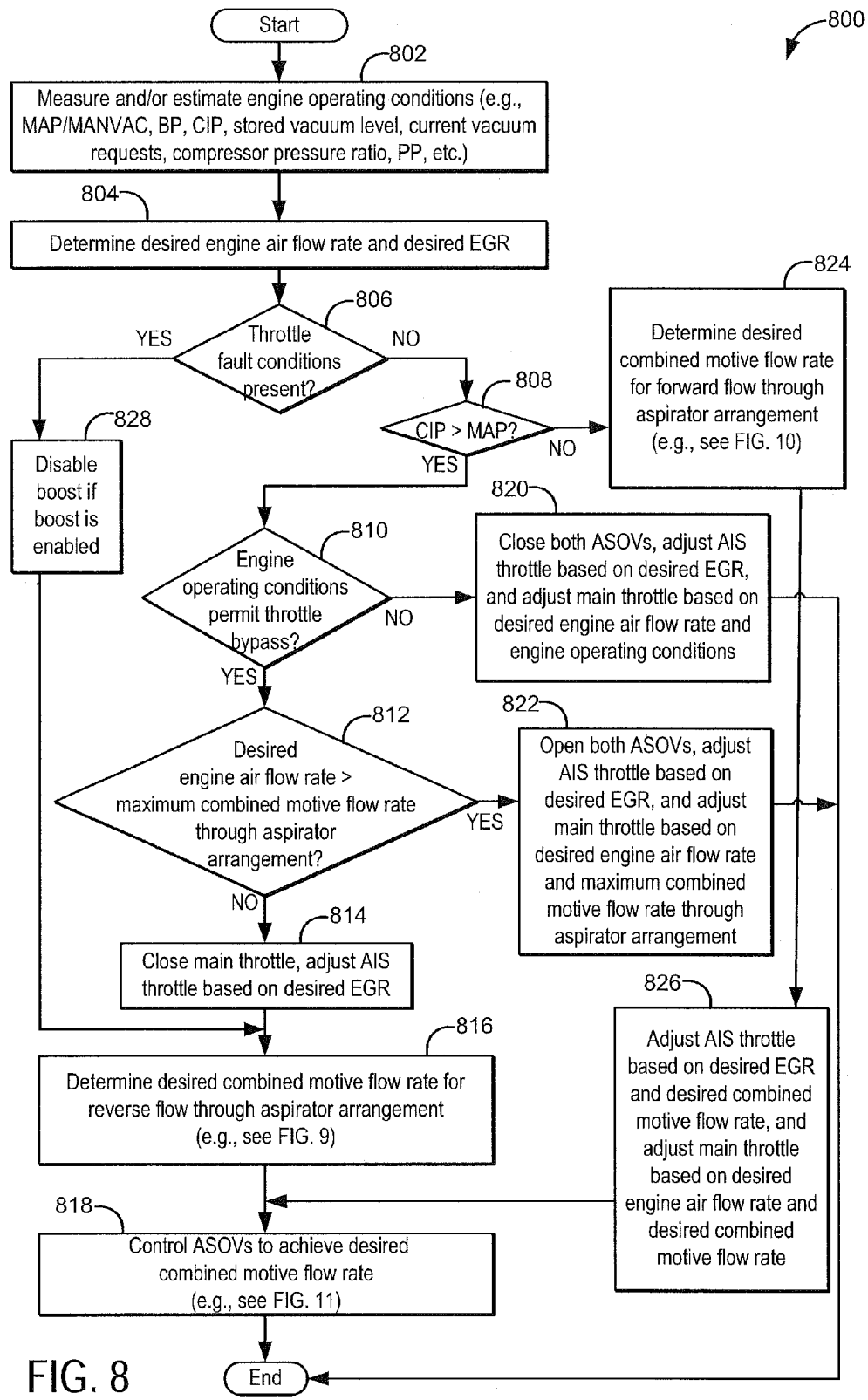
FIG. 8 shows a high level flow chart illustrating a routine that may be implemented in conjunction with the engine system of FIG. 3 and aspirator arrangement of FIG. 4 for controlling the operation of aspirator shut-off valves and intake throttles to achieve a desired combined motive flow rate through an aspirator arrangement.

Now referring to FIG. 8, an example method 800 for controlling the ASOVs and intake throttle(s) of the engine system of the second embodiment to achieve a desired combined motive flow rate through the aspirator arrangement is shown. The method of FIG. 8 may be used in conjunction with the first embodiment shown in FIGS. 3-4, the table shown in FIG. 6B, and the methods of FIGS. 9-11.

Many of the steps of methods 700 and 800 are identical, and therefore the above description of various steps of method 700 will not be repeated to avoid redundancy. Similar steps among the two methods are similarly numbered. Only steps which differ between the two methods will be described below.

At 808, method 800 includes determining whether CIP is greater than MAP. This determination may be made at controller 50 based on signals received from CIP sensor 363 and MAP sensor 360, for example. The relationship between CIP and MAP may determine whether forward flow or reverse flow through the aspirator arrangement is achievable via control of the state of the ASOVs.

At 814, method 800 includes closing the main throttle and adjusting the AIS throttle based on desired EGR. Step 814 is carried out when desired engine air flow rate is not greater than maximum combined motive flow rate through the aspirator arrangement and CIP is greater than MAP (indicating non-boost operation). During such conditions, all intake airflow may be diverted around the compressor to reduce throttling losses; accordingly, the main throttle may be closed. Because EGR passage 379 is coupled to intake passage 318 upstream of the aspirator arrangement, and because AIS throttle 331 is arranged in intake passage 318 upstream of EGR passage 379, the AIS throttle may be adjusted based on desired EGR at this step. For example, increasing opening of the AIS throttle may reduce the pressure in the intake passage proximal to the EGR passage, thereby increasing suction flow of EGR into the intake passage. This EGR flow may then be diverted around the compressor through the aspirator arrangement, depending on the states of the ASOVs.

At 816, method 800 includes determining a desired combined motive flow rate for reverse flow through the aspirator arrangement, for example in accordance with the method shown in FIG. 9 and described below. This is in contrast to step 716 of method 700, where a desired combined motive flow rate for forward flow through the aspirator is determined. Because the aspirator arrangement of the second embodiment is in effect oriented opposite to the aspirator arrangement of the first embodiment, as noted above, reverse flow through the aspirator arrangement of the second embodiment includes flow from upstream of the compressor to downstream of the compressor via the aspirator arrangement, similar to forward flow through the aspirator arrangement of the first embodiment.

Figure 10:
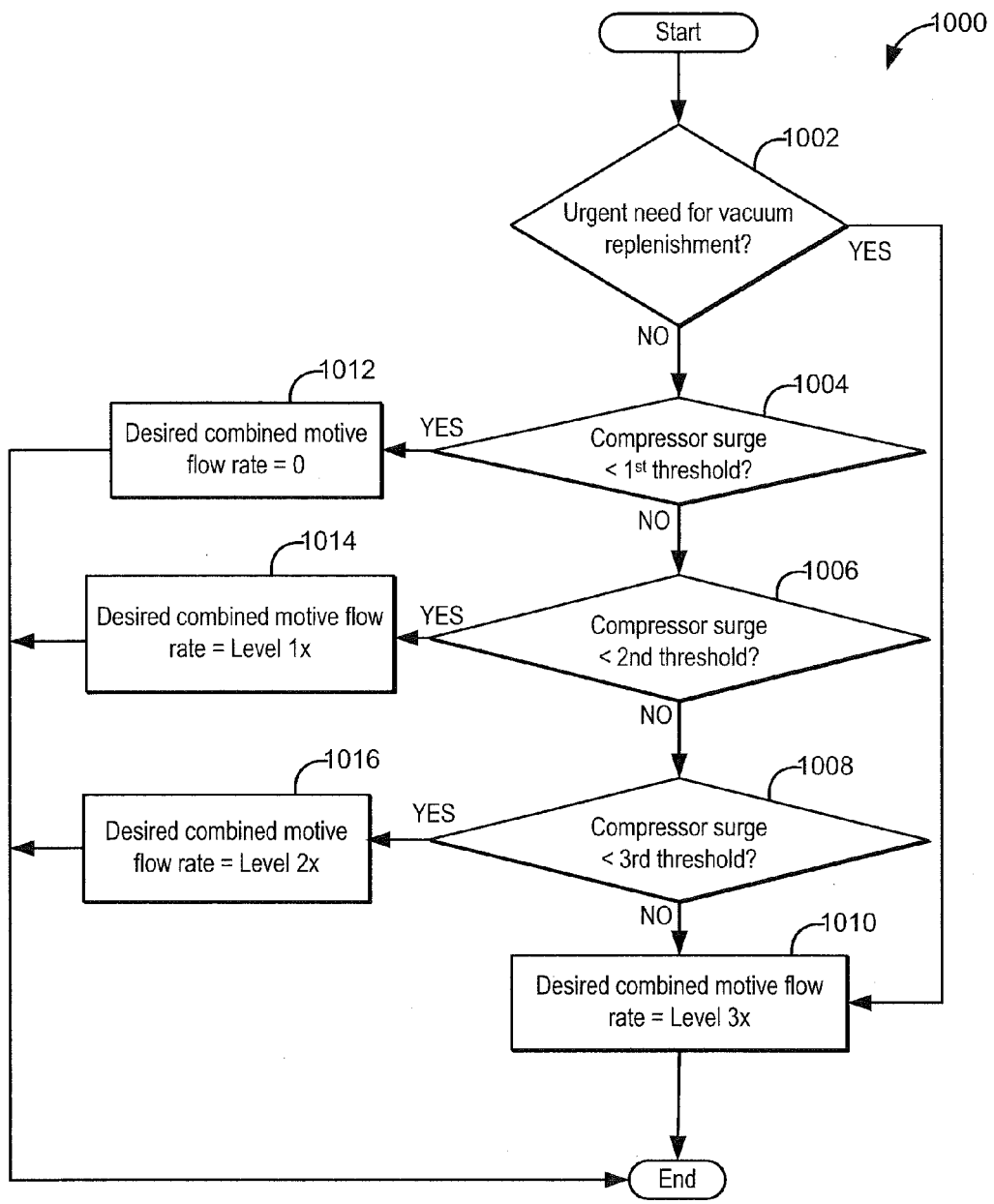
FIG. 10 shows a high level flow chart illustrating a routine that may be implemented for determining a desired combined motive flow rate through an aspirator arrangement during boost conditions, for use in conjunction with the methods of FIGS. 7 and 8.

At 824, method 700 includes determining a desired combined motive flow rate for reverse flow through the aspirator arrangement, for example in accordance with the method of FIG. 10. Again, this is in contrast to step 724 of method 700, where a desired combined motive flow rate for reverse flow through the aspirator is determined. Because the aspirator arrangement of the second embodiment is in effect oriented opposite to the aspirator arrangement of the first embodiment, as noted above, forward flow through the aspirator arrangement of the second embodiment includes flow from downstream of the compressor to upstream of the compressor via the aspirator arrangement, similar to reverse flow through the aspirator arrangement of the first embodiment.

At 826, like 726, method 800 includes adjusting the AIS throttle based on the desired EGR and adjusting the main throttle based on the desired engine air flow rate and the desired combined motive flow rate. However, unlike 726, 826 further includes adjusting the AIS throttle based on the desired combined motive flow rate. This is because the AIS throttle and EGR inlet are arranged upstream of the aspirator arrangement in the second embodiment (unlike the first embodiment). Accordingly, the position of the AIS throttle may affect an EGR flow rate into the intake passage, which in turn may affect the flow rate of fluid through the aspirator arrangement depending on the states of the ASOVs.

Figure 9:
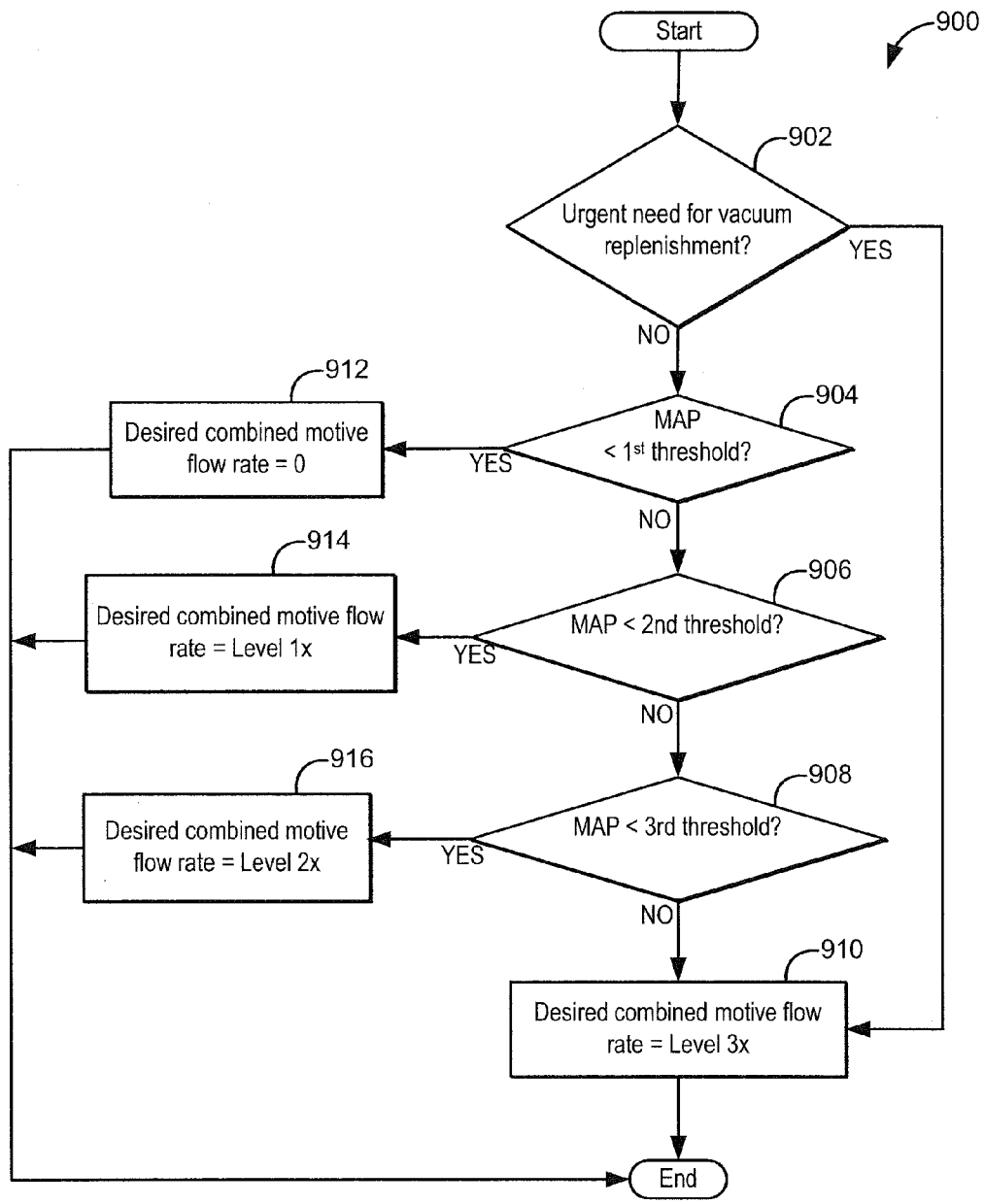
FIG. 9 shows a high level flow chart illustrating a routine that may be implemented for determining a desired combined motive flow rate through an aspirator arrangement during non-boost conditions, for use in conjunction with the methods of FIGS. 7 and 8.

Now referring to FIG. 9, an example method 900 for determining a desired combined motive flow rate through an aspirator arrangement during non-boost conditions is shown. Method 900 may be used at step 716 of method 700 and at step 816 of method 800, for example. Accordingly, method 900 may be used in the context of the embodiment FIGS. 1-2 as well as the embodiment of FIGS. 3-4.

At 902, method 900 includes determining whether there is an urgent need for vacuum replenishment. This determination may be based on a level of stored vacuum in the vacuum reservoir (e.g., as sensed by sensor 40 of FIG. 1), current vacuum requests (e.g., based on brake pedal position), MAP (e.g., as sensed by sensor 60 of FIG. 1), etc.

If the answer at 902 is NO, method 900 proceeds to 904. At 904, it is determined whether MAP is less than a first threshold. In one non-limiting example, the first threshold may be −40 kPa (e.g., equivalent to a MANVAC of 40 kPA). If MAP is less than the first threshold, the answer at 904 is YES, and method 900 proceeds to 912 where the desired combined motive flow rate is set to 0. After 912, method 900 ends.

Otherwise, if the answer at 904 is NO, indicating that MAP is greater than or equal to the first threshold, method 900 proceeds to 906 to determine whether MAP is less than a second threshold. In one non-limiting example, the second threshold may be −35 kPa (e.g., equivalent to a MANVAC of 35 kPa). If MAP is less than the second threshold, the answer at 906 is YES, and method 900 proceeds to 914 where the desired combined motive flow rate is set to Level 1x. After 914, method 900 ends.

If the answer at 906 is NO, however, indicating that MAP is greater than or equal to the second threshold, method 900 proceeds to 908 to determine if MAP is less than a third threshold. In one non-limiting example, the third threshold may be −30 kPa (e.g., equivalent to a MANVAC of 30 kPa). If MAP is less than the third threshold, the answer at 908 is YES, and method 900 continues to 916 to set the desired combined motive flow rate to Level 2x. Otherwise, if the answer at 908 is NO, indicating that MAP is greater than or equal to the third threshold, method 90 proceeds to 910 to set the desired combined motive flow rate to Level 3x.

Further, returning to step 902, if the answer is YES indicating that there is an urgent need for vacuum replenishment, method 900 proceeds to 910 to set the desired combined motive flow rate to Level 3x. After 910, method 900 ends.

Now referring to FIG. 10, an example method 1000 for determining a desired combined motive flow rate through an aspirator arrangement during boost conditions is shown. Method 1000 may be used at step 724 of method 700 and at step 824 of method 800, for example. Accordingly, similar to FIG. 9, method 1000 may be used in the context of the embodiment of FIGS. 1-2 as well as the embodiment of FIGS. 3-4. When method 1000 is used in the context of FIGS. 1-2, the desired combined motive flow rate is a rate of reverse flow, due to the orientation of the aspirators in this embodiment and the direction of flow during boost conditions. In contrast, when method 1000 is used in the context of FIGS. 3-4, the desired combined motive flow rate is a rate of forward flow, due to the orientation of the aspirators and the direction of flow during boost conditions. In one example, an asymmetrical aspirator may have a motive flow rate of 3.5 g/s in the forward direction and a motive flow rate of 3.0 g/s in the reverse direction. However, in the forward direction, the motive flow rate may remain constant (e.g., unchanging) when MANVAC is in the range of 15 kPa to 100 kPa, whereas in the reverse direction, the aspirator may generate less of a "sonic choke" effect, and thus the motive flow rate in the reverse direction may not be constant until MANVAC reaches 40 or 50 kPa.

At 1002, method 1000 includes determining whether there is an urgent need for vacuum replenishment, for example in the manner discussed above with regard to step 902 of method 900. After 1002, method 1000 proceeds to 1004.

At 1004, method 1000 includes determining whether compressor surge is less than a first threshold. This may include, for example, determining a likelihood of compressor surge being less than the first threshold before an actual occurrence of surge. Alternatively, the indication of surge may include an actual occurrence of surge less than the first threshold. The determination may be based on various sensed parameter values, such as values from CIP sensor 59 and MAP sensor 60. For example, a pressure differential between MAP and CIP may be indicative of the likelihood of surge and/or current surge level. The first threshold may be correspond to a minimum level at which surge is problematic, and thus when surge is less than the first threshold, it may not be desirable to recirculate air from downstream of the compressor to upstream of the compressor.

If the answer at 1004 is YES, method 1000 proceeds to 1012 where the desired combined motive flow rate is set to 0, e.g. such that air is not recirculated from downstream of the compressor to upstream of the compressor by way of the aspirator arrangement. After 1012, method 1000 ends.

Otherwise, if the answer at 1004 is NO, indicating that compressor surge is greater than or equal to the first threshold, method 1000 proceeds to 1006 to determine whether compressor surge is less than a second threshold, for example in the manner described above for step 1004. If the answer at 1006 is YES, method 1000 proceeds to 1014 to where the desired combined motive flow rate is set to Level 1x. When compressor surge is between the first and second thresholds, it may be desirable to provide a small recirculation flow to provide a small reduction in compressor surge (as compressor surge between the first and second thresholds may correspond to a relatively low level of compressor surge). After 1014, method 1000 ends.

If the answer at 1006 is NO, however, indicating that compressor surge is greater than or equal to the second threshold, method 1000 proceeds to 1008. At 1008, method 1000 includes determining whether compressor surge is less than a third threshold. If the answer at 1008 is YES, method 1000 proceeds to 1016 where the desired combined motive flow rate is set to Level 2x, as a greater rate of recirculation flow around the compressor may be desirable during such conditions. After 1016, method 1000 ends.

Otherwise, if the answer at 1008 is NO, indicating that compressor surge is greater than or equal to the third threshold, method 1000 proceeds to 1010 where the desired combined motive flow rate is set to Level 3x. For example, Level 3x may correspond to a maximum possible flow rate of recirculation flow through the aspirator arrangement (e.g., with all ASOVs fully open), and may be appropriate when compressor surge is relatively high. After 1010, method 1000 ends.

Figure 11:
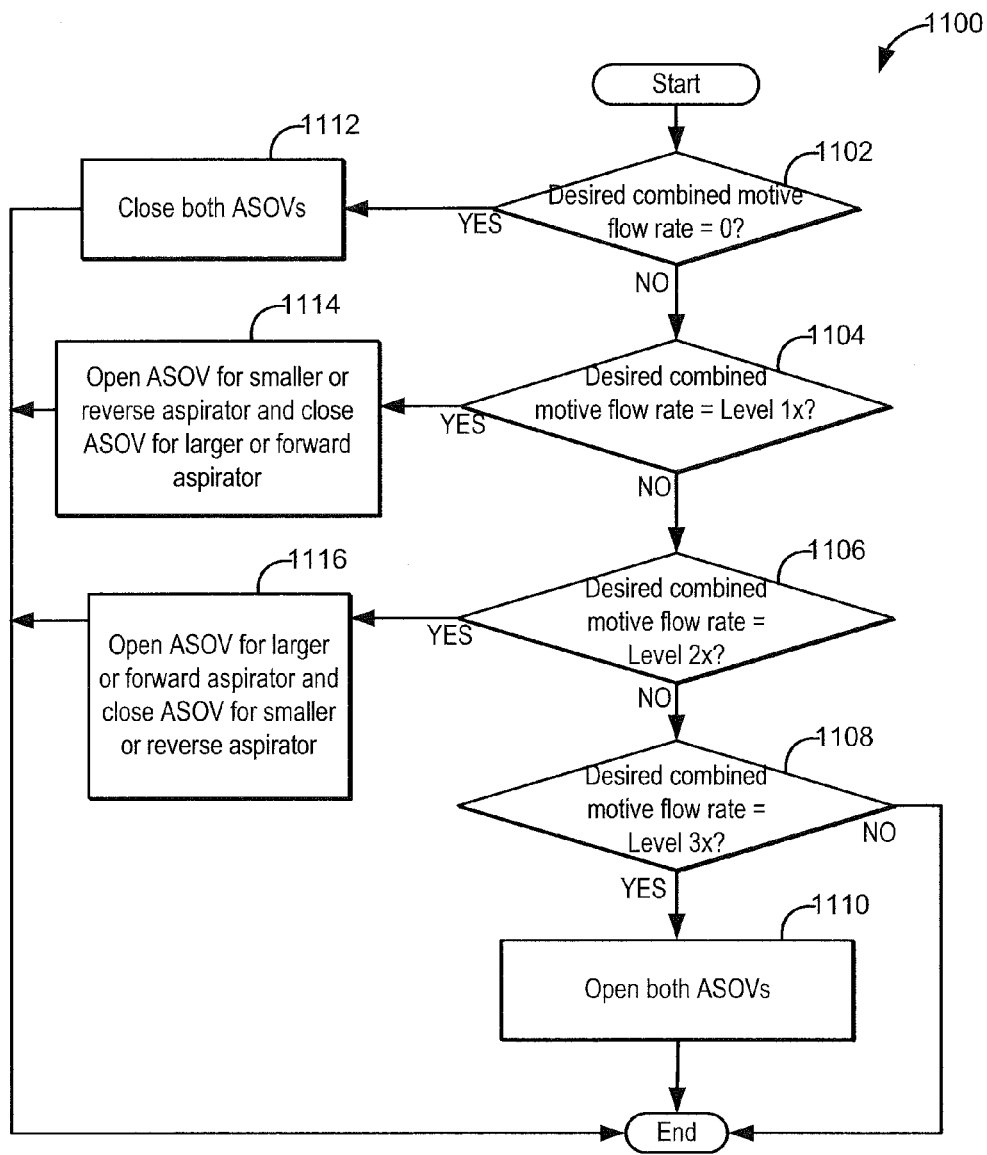
FIG. 11 shows a high level flow chart illustrating a routine that may be implemented for controlling aspirator shut-off valves, which may be used in conjunction with the methods of FIGS. 7 and 8.

Now referring to FIG. 11, an example method 1100 for controlling ASOVs is shown. Method 1100 may be used at step 718 of method 700 and at step 818 of method 800, for example. While . . . relates to aspirator arrangements with exactly two ASOVs, it will be appreciated that variations of method 1100 which may be applied to aspirator arrangements with more than two aspirators and thus more than two ASOVs also fall within the scope of the present disclosure.

At 1102, method 1100 includes determining whether the desired combined motive flow rate is equal to 0. If the answer at 1102 is YES, method 1100 proceeds to 1112 to close both ASOVs. After 1112, method 1100 ends.

Otherwise, if the answer at 1102 is NO, method 1100 proceeds to 1104. At 1104, method 1100 includes determining whether the desired combined motive flow rate is equal to Level 1x. If the answer at 1104 is YES, method 1100 proceeds to 1114 to open the ASOV for the smaller or reverse aspirator and close the ASOV for the larger or forward aspirator. That is, when method 1100 is used in the context of the aspirator arrangements depicted in FIGS. 2 and 4, step 1104 may include opening the ASOV for the smaller aspirator and closing the ASOV for the larger aspirator. However, when method 1100 is used in the context of the aspirator arrangement depicted in FIG. 5, step 1104 may include opening the ASOV for the reverse aspirator and closing the ASOV for the forward aspirator (where "reverse" and "forward" are relative to the direction of flow for current engine operating conditions), depending on the relative sizes of the aspirators. After 1114, method 1100 ends.

Alternatively, if the answer at 1104 is NO, method 1100 proceeds to 1106. At 1106, method 1100 includes determining whether the desired combined motive flow rate is equal to Level 2x. If the answer at 1106 is YES, method 1100 proceeds to 1116 to open the ASOV for the larger or forward aspirator and close the ASOV for the smaller or reverse aspirator. That is, when method 1100 is used in the context of the aspirator arrangements depicted in FIGS. 2 and 4, step 1106 may include opening the ASOV for the larger aspirator and closing the ASOV for the smaller aspirator. However, when method 1100 is used in the context of the aspirator arrangement depicted in FIG. 5, step 1104 may include opening the ASOV for the forward aspirator and closing the ASOV for the reverse aspirator (where "reverse" and "forward" are relative to the direction of flow for current engine operating conditions), depending on the relative sizes of the aspirators. After 1116, method 1100 ends.

However, if the answer at 1106 is NO, method 1100 continues to 1108. At 1108, method 1100 includes determining whether the desired combined motive flow rate is equal to Level 3x. If the answer at 1108 is YES, method 1100 proceeds to 1110 to open both ASOVs, as this may result in a maximum possible combined flow rate though the aspirator arrangement for current engine operating conditions. After 1110, method 1100 ends.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. An engine method, comprising:
    adjusting a combined motive flow rate through a parallel arrangement of at least two aspirators bypassing a compressor by controlling, for each aspirator, a shut-off valve arranged in series upstream of a motive inlet of the aspirator based on engine vacuum needs and intake manifold pressure when intake manifold pressure is below a threshold, and based on engine vacuum needs and compressor surge when intake manifold pressure is above the threshold.

2. The method of claim 1, wherein the aspirator arrangement further bypasses a main throttle arranged downstream of the compressor and upstream of the intake manifold, the method further comprising controlling the main throttle based on a desired engine air flow rate and the combined motive flow rate through the aspirator arrangement.

3. The method of claim 1, wherein adjusting the combined motive flow rate through the aspirator arrangement when intake manifold pressure is below the threshold comprises increasing the combined motive flow rate through the aspirator arrangement as intake manifold pressure increases.

4. The method of claim 3, wherein adjusting the combined motive flow rate through the aspirator arrangement when the intake manifold pressure is above the threshold comprises increasing the combined motive flow rate through the aspirator arrangement as compressor surge increases.

5. The method of claim 4, further comprising setting the combined motive flow rate to one of a plurality of discrete motive flow rates via individual control of each of the shut-off valves.

6. The method of claim 5, wherein the shut-off valves are binary valves, further comprising:
    when the combined motive flow rate is set to zero, closing all shut-off valves of the aspirator arrangement to allow no motive flow through the aspirator arrangement; and
    when the combined motive flow rate is set to a maximum combined motive flow rate through the aspirator arrangement, opening all shut-off valves of the aspirator arrangement.

7. The method of claim 6, wherein the aspirator arrangement includes exactly two aspirators, further comprising:
    when the combined motive flow rate is set to a first level greater than zero and less than a second level, the second level less than the maximum combined motive flow rate, opening a first shut-off valve arranged in series with a first, smaller aspirator of the two aspirators and closing a second shut-off valve arranged in series with a second, larger aspirator of the two aspirators; and
    when the combined motive flow rate is set to the second level, closing the first shut-off valve and opening the second shut-off valve.

8. The method of claim 6, further comprising setting the combined motive flow rate to the maximum combined motive flow rate responsive to urgent engine vacuum needs.

9. A method for an engine, comprising:
    directing intake air through none, one, or more than one of a plurality of aspirators of a parallel aspirator arrangement fluidly coupled to an engine intake passage both upstream of a compressor and downstream of the compressor based on engine operating conditions, wherein directing intake air through an aspirator of the aspirator arrangement comprises opening an aspirator shut-off valve arranged in series with a motive inlet of the aspirator;

when intake manifold pressure is below barometric pressure, directing intake air through an increasing number of the aspirators of the aspirator arrangement as intake manifold pressure increases; and when intake manifold pressure is above barometric pressure, directing intake air through an increasing number of the aspirators of the aspirator arrangement as compressor surge increases.

10. The method of claim 9, further comprising directing intake air through all of the aspirators of the aspirator arrangement responsive to urgent engine vacuum needs.

11. The method of claim 9, wherein the aspirator arrangement includes exactly two aspirators, wherein a desired combined motive flow rate through the aspirator arrangement increases as intake manifold pressure or compressor surge increases, and wherein directing intake air through an increasing number of aspirators comprises:

directing intake air through none of the two aspirators when the desired combined motive flow rate is set to zero;

directing intake air through only a first, smaller aspirator of the two aspirators when the desired combined motive flow rate is set to a first level greater than zero;

directing intake air through only a second, larger aspirator of the two aspirators when the desired combined motive flow rate is set to a second level greater than the first level and less than a maximum combined motive flow rate through the aspirator arrangement; and directing intake air through both the first aspirator and the second aspirator when the desired combined motive flow rate is set to the maximum combined motive flow rate.

12. The method of claim 11, wherein a throat flow area of the first aspirator is half of a size of a throat flow area of the second aspirator.

13. A system for an engine, comprising:

an aspirator arrangement comprising at least two aspirators arranged in parallel passages, the aspirator arrangement fluidly coupled to an engine intake passage both upstream of a compressor and downstream of the compressor;

a plurality of aspirator shut-off valves, each aspirator shut-off valve arranged in series with a corresponding aspirator of the aspirator arrangement;

a vacuum reservoir fluidly coupled to entraining inlets of all of the aspirators of the aspirator arrangement; and a controller with computer readable instructions for controlling the aspirator shut-off valves based on a desired combined motive flow rate through the aspirator arrangement, the desired combined motive flow rate based on intake manifold pressure and engine vacuum needs during non-boost conditions, and based on compressor surge and engine vacuum needs during boost conditions.

14. The system of claim 13, wherein a motive inlet of the aspirator arrangement is coupled to the intake passage upstream of the compressor, and wherein a mixed flow outlet of the aspirator arrangement is coupled to the intake passage downstream of the compressor and downstream of a main intake throttle.

15. The system of claim 13, wherein a motive inlet of the aspirator arrangement is coupled to the intake passage downstream of the compressor and downstream of a main intake throttle, and wherein a mixed flow outlet of the aspirator arrangement is coupled to the intake passage upstream of the compressor and downstream of an air intake system throttle.

16. The system of claim 13, wherein at least two of the aspirators of the aspirator arrangement have different throat flow areas.

17. The system of claim 13, wherein a motive inlet of a first aspirator of the aspirator arrangement is fluidly coupled to the intake passage upstream of the compressor and a mixed flow outlet of the first aspirator is fluidly coupled to the intake passage downstream of the compressor, and wherein a motive inlet of a second aspirator of the aspirator arrangement is fluidly coupled to the intake passage downstream of the compressor and a mixed flow outlet of the second aspirator is fluidly coupled to the intake passage upstream of the compressor.

* * * * *